US008134963B1

United States Patent
Chen et al.

(10) Patent No.: US 8,134,963 B1
(45) Date of Patent: Mar. 13, 2012

(54) METHOD AND SYSTEM FOR REDUCING CONNECTION SET-UP TIME

(75) Inventors: Xixian Chen, Nepean (CA); Vasanta Chivukula, Nepean (CA); Weigang Li, Ottawa (CA); Guoqiang Xue, Kanata (CA); Ryan Santa, Kanata (CA); Miroslav Budic, Murphy, TX (US); Brian Troup, Richardson, TX (US); Martin Kendall, Wylie, TX (US)

(73) Assignee: Ericsson AB, Stockholm (SE)

( * ) Notice: Subject to any disclaimer, the term of this patent is extended or adjusted under 35 U.S.C. 154(b) by 313 days.

(21) Appl. No.: 12/098,073

(22) Filed: Apr. 4, 2008

Related U.S. Application Data

(60) Provisional application No. 60/910,301, filed on Apr. 5, 2007.

(51) Int. Cl.
   *H04Q 7/00* (2006.01)
(52) U.S. Cl. .................................. 370/329; 370/338
(58) Field of Classification Search .......... 370/328–331, 370/338, 342; 455/436–444
See application file for complete search history.

(56) References Cited

U.S. PATENT DOCUMENTS

| 2002/0111169 | A1* | 8/2002 | Vanghi ........................ 455/436 |
| 2006/0234707 | A1* | 10/2006 | Byun et al. .................. 455/436 |
| 2006/0245407 | A1* | 11/2006 | Chen et al. .................. 370/338 |
| 2007/0070942 | A1* | 3/2007 | Harris et al. ................. 370/329 |

OTHER PUBLICATIONS

TIA-856-A, which corresponds to 3GPP2 C.S0024-A, v1.0, titled "CDMA2000 High Rate Packet Data Air Interface Specification", (Mar. 2004), pp. 1-526.
TIA-856-A, which corresponds to 3GPP2 C.S0024-A v1.0, titled "CDMA2000 High Rate Packet Data Air Interface Specification", Mar. 2004, pp. 1-1083.
TIA-856-A, which corresponds to 3GPP2 C.S0024-B v1.0, titled "CDMA2000 High Rate Packet Data Air Interface Specificaiton", Apr. 2006, pp. 1-1623.

\* cited by examiner

*Primary Examiner* — Pao Sinkantarakorn
(74) *Attorney, Agent, or Firm* — Potomac Patent Group PLLC

(57) ABSTRACT

A method of connection setup in mobile wireless data communications systems is disclosed where the connection setup time is decreased for delay-sensitive communications sessions relative to the normal connection setup time for confidence-dependent communications sessions. This is achieved by performing some of the connection set-up steps for delay-sensitive communications sessions after successfully demodulating a smaller number of indications identifying an access terminal's desired serving resource than would be demodulated in the case of a confidence-dependent communication session prior to performing the same connection set-up steps.

23 Claims, 16 Drawing Sheets

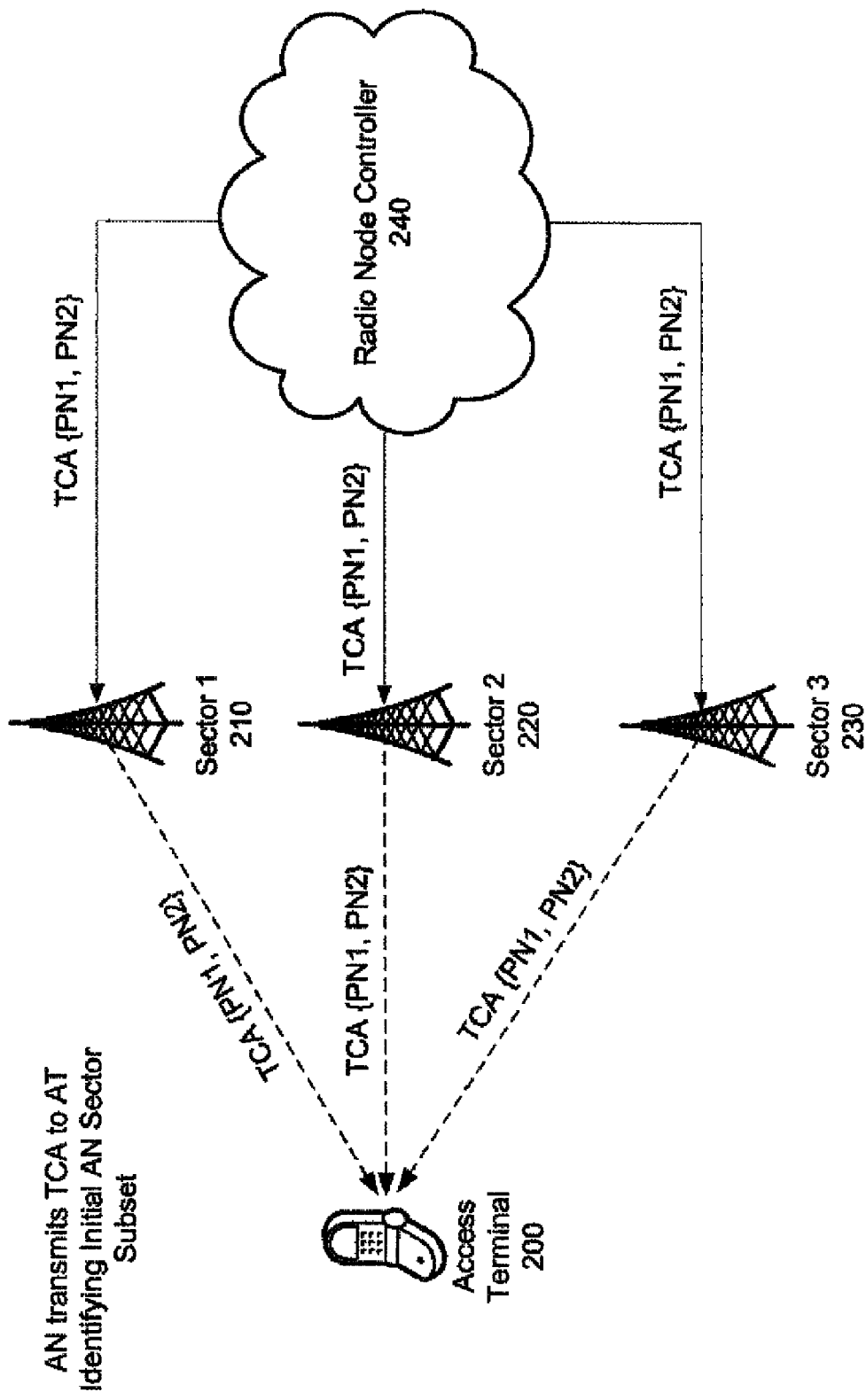

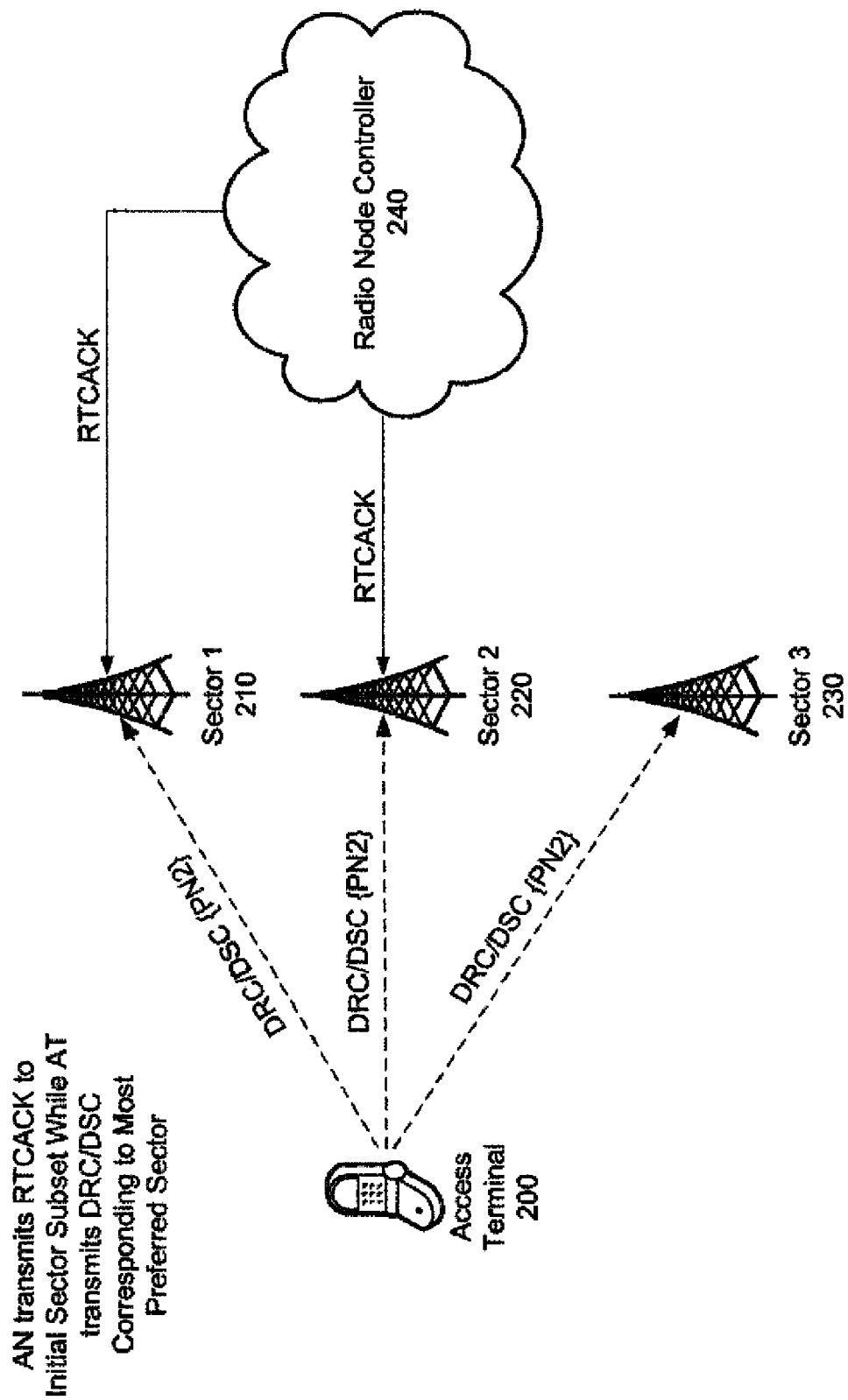

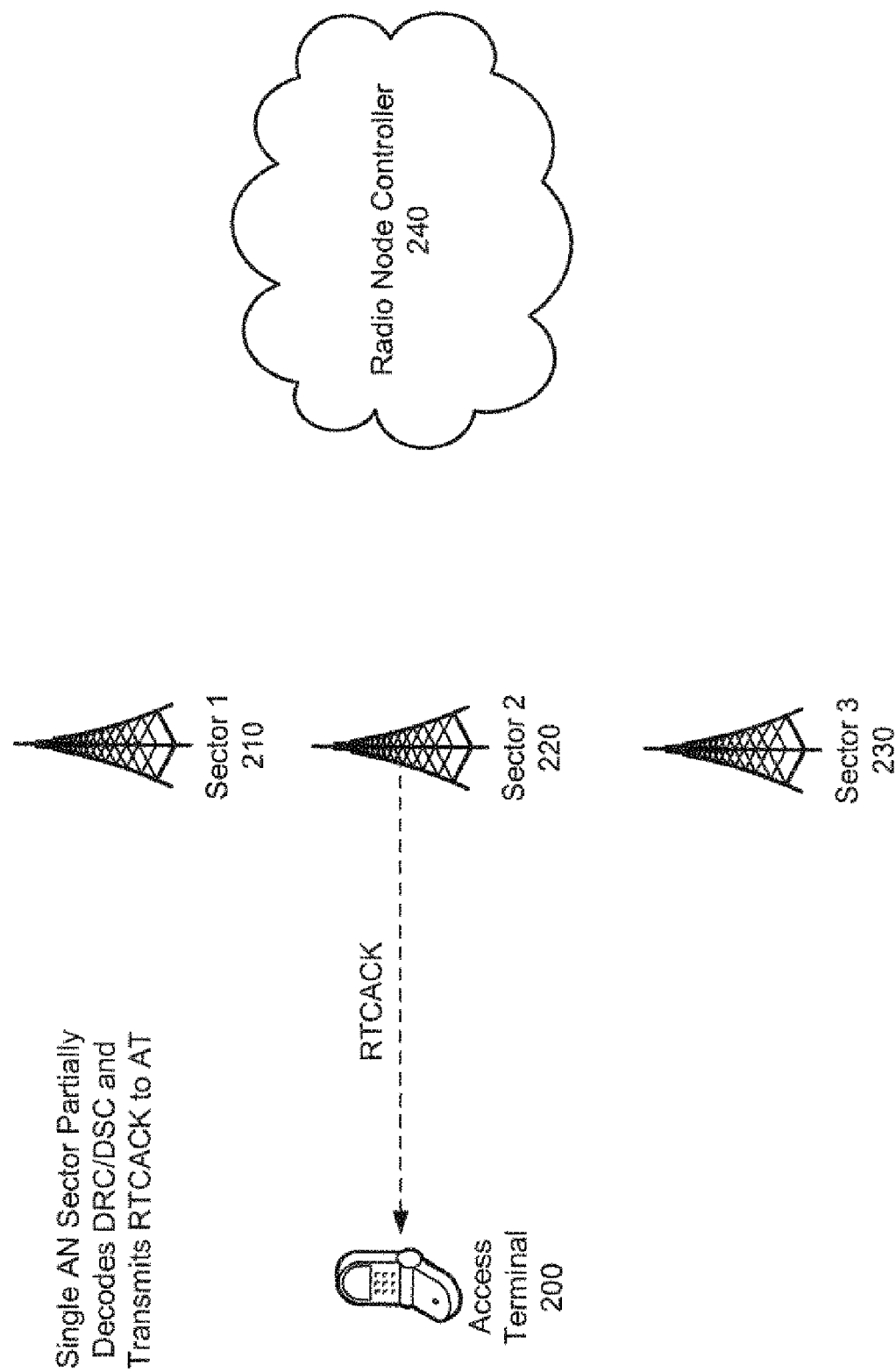

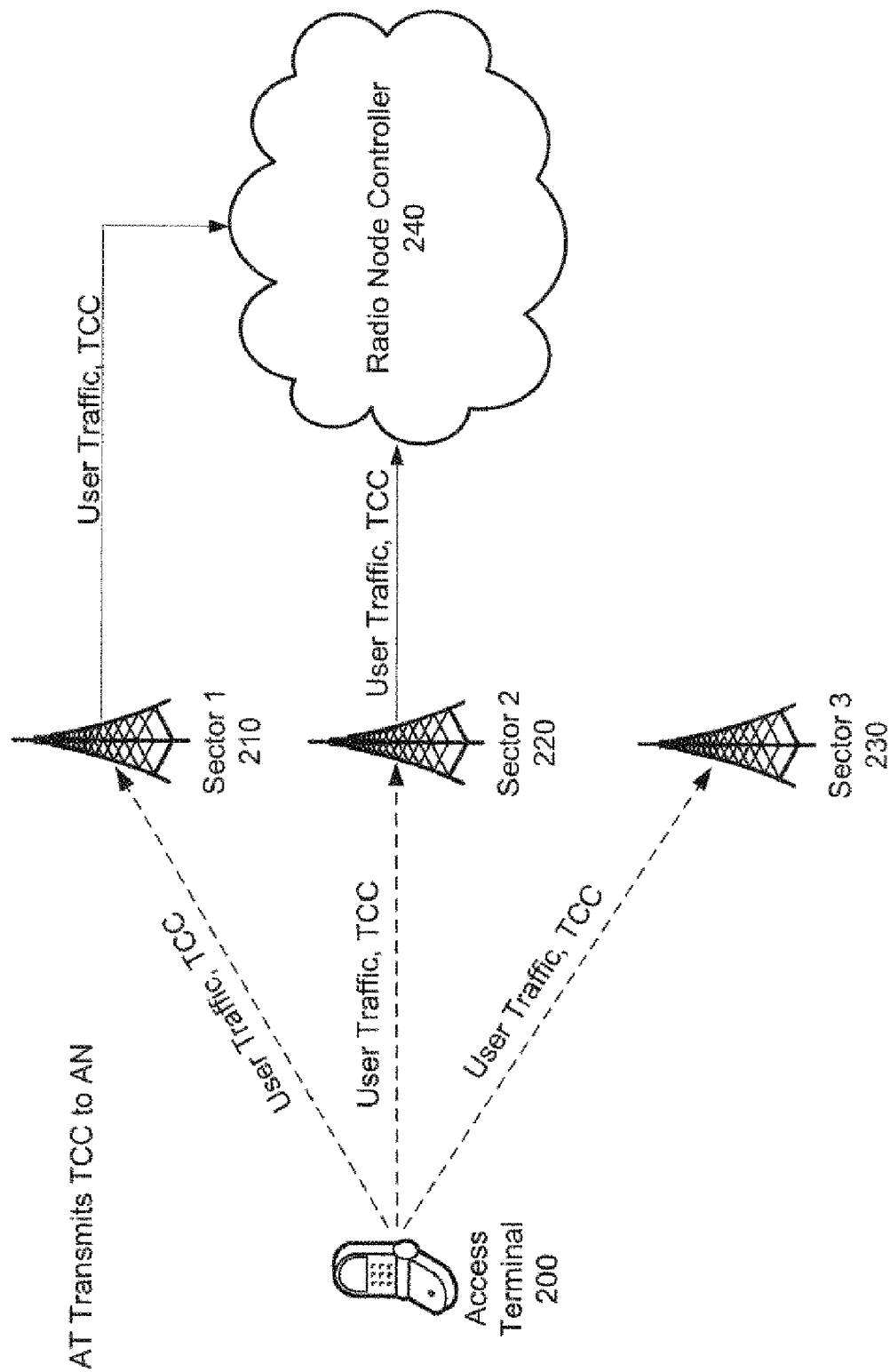

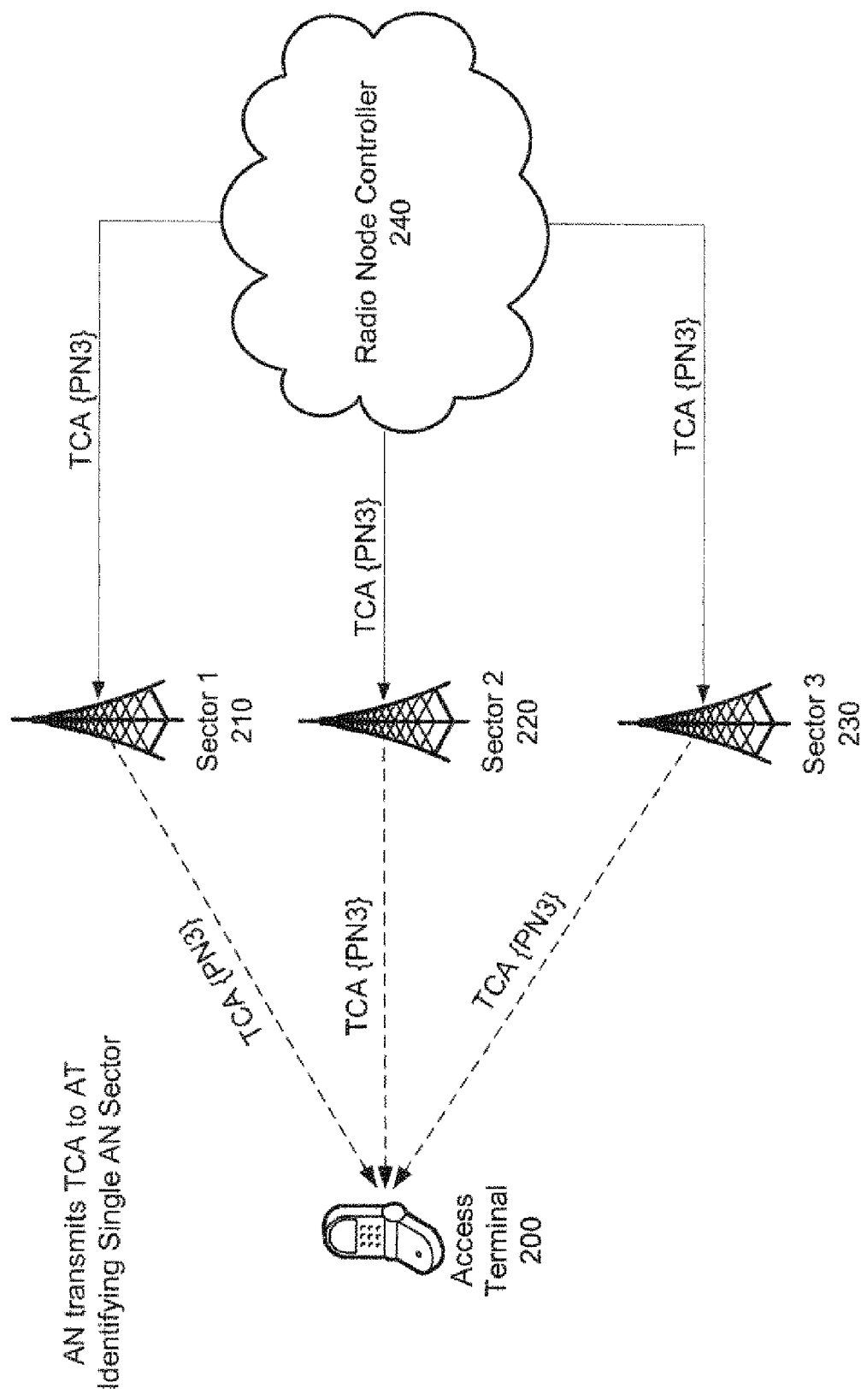

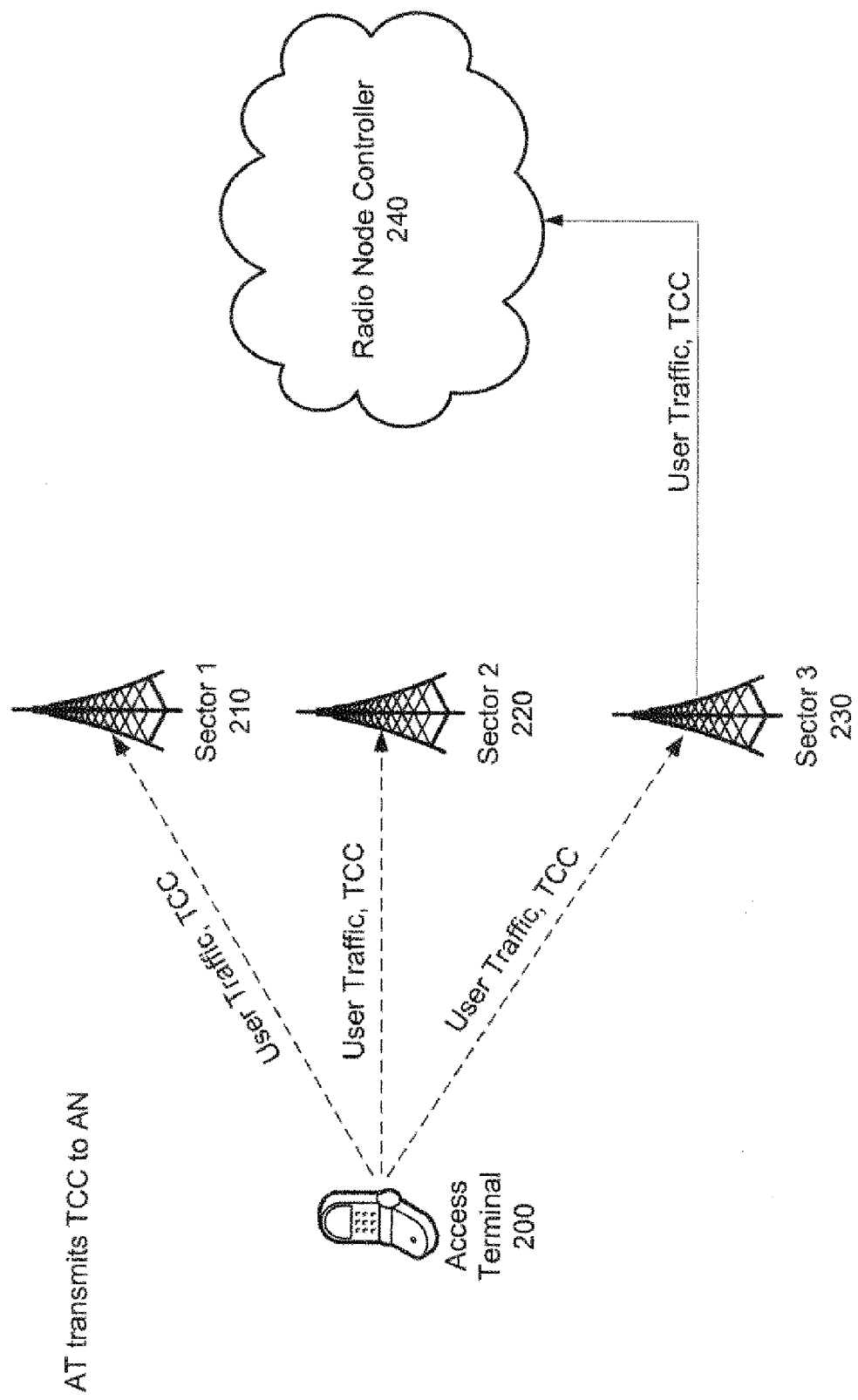

METHOD AND SYSTEM FOR REDUCING CONNECTION SET-UP TIME

CROSS REFERENCE TO RELATED APPLICATIONS

This application claims the benefit of priority of U.S. Provisional Patent Application No. 60/910,301 filed Apr. 5, 2007, which is incorporated herein by reference in its entirety.

FIELD OF THE INVENTION

The present invention relates generally to reducing a connection setup time in wireless networks. More particularly, the present invention relates to reducing the connection setup time on a PTT session in wireless networks, such as 3GPP (including GSM, UMTS and LTE), 3GPP2 (including 1xEV-DO) and IEEE 802.16-compliant wireless networks.

BACKGROUND OF THE INVENTION

Data transmission over wireless networks has evolved considerably in the past decade. Third generation wireless technologies such as the CDMA2000 1xEV-DO standard enable wireless voice transmission over data networks, such as voice over Internet Protocol (VOIP).

One possible implementation of a mobile voice over data application is a push to talk application (PTT) over 1xEV-DO. EV-DO originally stood for "evolution data-only," but has come to be known as evolution data-optimized, since technologies like VOIP make it possible to transmit voice over data links. PTT applications, in general, are popular for enabling communications with groups of mobile units, since voice messages to groups can be carried out with a single call. PTT applications that transform mobile phones into "walkie-talkies" are also popular with regular mobile telephone users, but the ability to transmit messages to groups has made push to talk applications particularly useful in setting up dispatch systems. Dispatch systems make good candidates for VOIP PTT systems since fleets of vehicles may be efficiently managed by push to talk dispatch systems operating over secured Internet links.

One constraint on the user-friendliness and widespread adoption of mobile phone PTT systems is the amount of time required to setup a connection. While some currently deployed systems boast connection times under one second, the actual delay between a user's pressing of the "PTT" button on their mobile device and their receipt of the talk permit tone indicating connection (the "push to beep" time or PTB time) is still long enough to present a noticeable and undesirable delay to users. The talk permit tone is applied after both originating and terminating users have acquired the traffic channel.

The current connection setup protocol defined in the 1xEV-DO standard is a serial process. The 1xEV-DO standard is defined in the Telecommunications Industry Association's standards such as (equivalent free of charge standards from the 3rd Generation Partnership Project 2 industry consortium in brackets): TIA-856-A (3GPP2 C.S0024-A) and TIA-856-B (3GPP2 C.S0024-B), each of which is hereby incorporated herein in its entirety. The CDMA2000® spread spectrum standard, TIA-2000.2-D (3GPP2 C.S0002-D), upon which 1xEV-DO builds, defines the spread-spectrum characteristics of the 1xEV-DO system and is incorporated herein in its entirety. As defined in these standards, each step in the 1xEV-DO connection setup process occurs sequentially. The PTB time is therefore the sum of the time that each step takes to process.

The current 1xEV-DO connection setup protocol is illustrated in FIGS. 6 and 7, and comprises a series of at least seven sequential steps. FIG. 6 is a timing diagram that illustrates the messaging flows and associated delays inherent in the connection setup. FIG. 7 is a flowchart illustrating the connection setup process at a more conceptual level. It should be appreciated that although only one access network sector 250 is illustrated in FIG. 6, there may by any number of access network sectors 250 according to the topology of the network. Access network sectors 250 are controlled from base stations, each base station typically controlling three access network sectors 250. Connection setup begins at step 710 when the access network's radio node controller 240 receives a connection request (CR) from an access terminal 200 along with a route update message listing the access network sectors that the access terminal is currently monitoring. This list of access network sectors is one of several maintained by the access terminal 200, which divides all of the access network sectors into four groups according to criteria such as signal strength and drop rates: an active set, a candidate set, a neighbor set, and a remaining set. The active set is the set of pilot signals associated with the access network sectors whose control channels are currently being monitored by the access terminal. The active set includes information such as the pseudo-noise (PN) codes used by each of the access network sectors in the active set, as well as an assessment by the access terminal 200 of whether it is desirable to keep each active set sector in the active set. In setting up an initial connection, the route update message that is sent as part of the transmission that occurs at step 710 identifies the active set by listing the PN codes for the sectors that make up the active set, and indicating those that it wishes to keep in the set. At step 720, the access network's radio node controller 240 uses this route update message to update its own active set, keeping only those access network sectors which the access terminal 200 wishes to keep, and which have enough resources that a connection between the access network's radio node controller 240 and access terminal 200 through the given access network sector is possible. The access network's active set may therefore be of smaller or equal size than the active set received from the access terminal 200 at step 710. At step 730 the access network's radio node controller 240 transmits a traffic channel allocation (TCA) message to each of the sectors in its active set. The traffic channel allocation message contains a list of each sector's PN code as well as the data rate control (DRC) covers and data source control (DSC) values for each sector in the active set. Upon receipt of the traffic channel allocation message, the access terminal 200 updates its active set to the initial subset of access network sectors identified in the traffic channel allocation message. At step 740, the access terminal 200 identifies a single access network sector in its active set as its desired serving sector, usually based on its superior signal strength, and begins transmitting its serving sector's DRC cover and DSC value to the access network's radio node controller 240 over a DRC channel. It is said that the access terminal 200 has pointed its DRC at the desired serving sector. The access terminal's transmissions over the DRC channel comprise frames, and each frame comprises sixteen slots, each slot having a duration of approximately 1.667 ms and containing a DRC cover. At step 750 the desired access network sector at which the access terminal 200 is pointing its DRC demodulates enough frames from the signal sent by the access terminal 200 at step 740 that it is able to fully acquire it. This step of acquiring the DRC/

DSC information is accomplished using status-filters whose characteristics are specific to the particular DRC as defined in the 1xEV-DO standard. Attaining lock-status for a given serving sector, such that the access terminal's signal is said to be fully acquired, can take up to 200 ms, and represents a significant portion of the PTB delay. One reason the acquisition process takes so long is due to the quality of service required for data-only traffic. Typically, a large number (e.g. 200 or more) of DRC channel slots are demodulated in order to be able to ascertain the desired serving sector with a high level of confidence. Thus, if a confidence threshold of 60% is desired, even if every DRC slot is successfully demodulated, the system will wait until 120 slots out of the first 200 have been successfully demodulated before it determines that it has fully acquired the signal, and because each of those 120 slots is approximately 1.667 ms long, the full acquisition process takes approximately 200 ms. Although lower confidence thresholds are known, confidence thresholds below 40% are considered low, and thresholds higher than 60% are common, leading to even longer PTB times. After this threshold number of DRC channel slots have been demodulated, each indicating the same desired serving sector, the access terminal's signal can be considered fully acquired. At step 755, once the access terminal's DRC/DSC channel has been fully acquired, the access network's radio node controller 240 then sends a reverse traffic channel acknowledgement (RTCACK) indication to the access terminal 200 through its serving sector. In most embodiments of PTT over 1xEV-DO, this is the point at which the "beep" occurs, and is the point in time against which the PTB delay is measured. At step 760, the access terminal 200 sends a traffic channel complete (TCC) indication to the access network's radio node controller 240. Once the connection is completed at step 760, user traffic begins at step 770, and the process enters a continuous phase wherein the connection is regularly updated to maintain the connection as may be required by changes in network conditions and the location of the access terminal 200.

The advantage of this serial process described above is that a high degree of reliability is achieved in setting up 1xEV-DO connections, particularly as far as the full acquisition of the DRC/DSC channel is concerned. This is useful for data transmissions, which can not tolerate errors, and can even conserve bandwidth by reducing the number of retransmissions of data frames. However, this reliability is achieved at the price of speed. Since each step is carried out after the previous step is complete, the PTB delay is the sum of the time that each of the steps takes. As a result, the PTB time in 1xEV-DO systems is a noticeable and undesirable delay. In the case of voice transmissions such as PTT voice transmissions, we have realized that it is more desirable to achieve faster connection speeds than it is to achieve high quality of service during the initial frames of a given voice transmission. In the case of push to talk, we have realized that a faster connection setup method can be achieved by performing in parallel some of the steps previously performed in series.

SUMMARY OF THE INVENTION

It is an object of the present invention to provide expedient PTT call setup, thus overcoming a significant disadvantage of the existing serial process described above.

In a first aspect, the present invention provides a method of setting up a communications link between an access terminal and an access network, the method comprising the steps of: a) receiving a connection request and a set of potential access network serving sectors from the access terminal; b) sending a traffic channel allocation to the access terminal identifying an initial subset of the set of potential access network serving sectors; and c) sending a reverse traffic channel acknowledgement indication to the access terminal, via at least one access network serving sector selected from the initial subset, before a desired access network serving sector is fully acquired.

In a further embodiment, there is provided a method of setting up a communications link between an access terminal and an access network, the method comprising the steps of: a) receiving a connection request and a set of potential access network serving sectors from the access terminal; b) sending a traffic channel allocation to the access terminal identifying an initial subset of the set of potential access network serving sectors; and c) performing at least one of the following steps in parallel with a step of fully acquiring a desired access network serving sector: c1) sending a reverse traffic channel acknowledgement indication to the access terminal via at least one access network serving sector selected from the selected subset; c2) receiving user traffic from the access terminal; and c3) receiving a traffic channel complete indication from the access terminal.

In a further aspect, the present invention provides a method of establishing a connection request comprising: receiving a connection request for a communication session from an access terminal, said request identifies a set of potential serving resources; determining whether said session is a delay sensitive session or a confidence dependent session; sending a resource allocation to the access terminal identifying an initial subset of the set of potential serving resources; receiving a series of indications identifying a desired serving resource; sending an acknowledgment signal confirming said desired serving resource after a first number of said indications is successfully demodulated for a delay sensitive session; and sending an acknowledgment signal confirming said desired serving resource after a second number of said indications is successfully demodulated for a confidence dependent session; said first number being less than said second number.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 4a is a system level illustration of the second and third steps in the method illustrated in FIG. 1 according to an embodiment of the invention.

FIG. 4b is a system level illustration of the fourth (parallel) steps in the method illustrated in FIG. 1 according to an embodiment of the invention.

FIG. 4c is a system level illustration of the fifth and sixth steps in the method illustrated in FIG. 1 according to an embodiment of the invention.

FIG. 4d is a system level illustration of the seventh step in the method illustrated in FIG. 1 according to an embodiment of the invention.

FIG. 5a is a system level illustration of the second and third steps in the method illustrated in FIG. 2 according to an embodiment of the invention.

FIG. 5c is a system level illustration of the fifth step in the method illustrated in FIG. 2 according to an embodiment of the invention.

DETAILED DESCRIPTION

Figure 7:
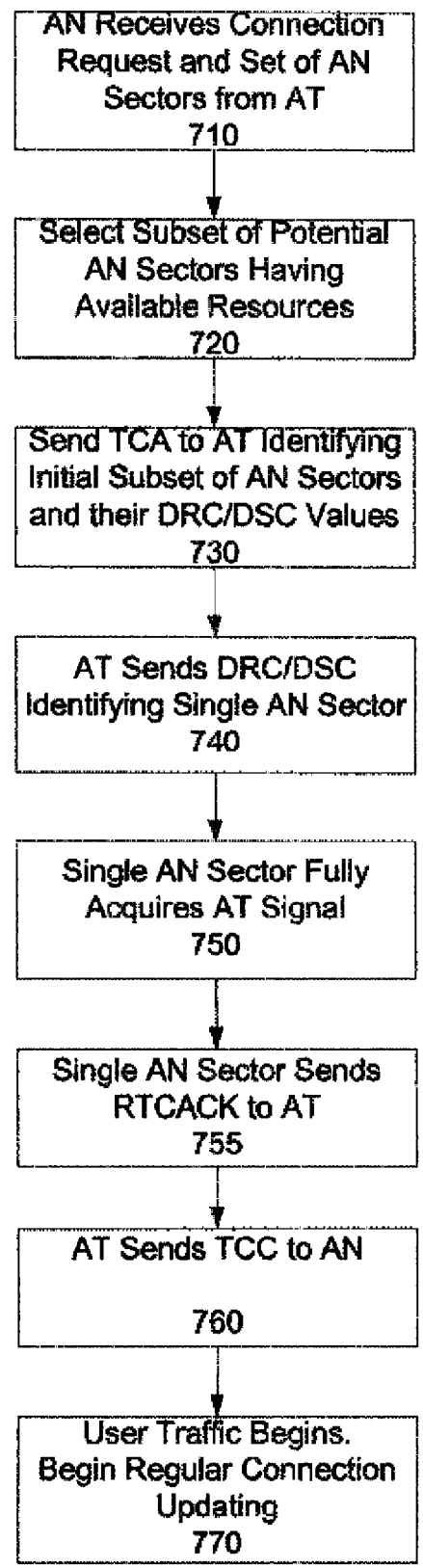
FIG. 7 is an illustration of the prior art method of setting up a connection in a 1xEV-DO PTT application according to an embodiment of the invention.

Generally, the present invention provides a method and system for reducing connection setup time for voice over data in wireless networks. We will describe embodiments of the invention with reference to an exemplary application of PTT in 1xEV-DO systems; however, it should be appreciated that the following description may be adapted, with such modifications as may be necessary, to other air interfaces, such as those encompassed by, for example, 3GPP (including GSM, UMTS and LTE) and IEEE 802.16 (including WiMAX). In an exemplary embodiment of the present invention set out herein, a reduction of the connection setup time is achieved by parallel execution of certain steps in the standard 1xEV-DO connection setup method that are normally executed in series. Specifically, it has been discovered that the reverse traffic acknowledgement step which occurs in step 755 of the prior art method illustrated in FIG. 7 can be executed before the AT signal transmitted at step 740 is fully acquired. In some embodiments, the transmission of user traffic and/or a traffic channel complete signal can begin as soon as transmission over the DRC channel begins, and before the DRC channel is fully acquired. In some implementations, this can occur even before the RTCACK message has been sent to the access terminal 200 (although this may require changes to the way the access terminal is configured). Indeed, the transmission of user traffic can optionally begin substantially immediately after the transmission over the DRC channel begins; the term substantially immediately meaning that user traffic may begin at the same time as the first DRC slot is transmitted, or after anywhere between one and sixteen DRC slots have been transmitted, depending on the desired trade-off between speed and reliability.

In other words, several steps previously carried out in series can be carried out in parallel while still maintaining much of the reliability afforded by the serial process described above. In this specification, where the term "parallel" is used, it should be understood to mean the tandem execution of a first set of steps at the same time as a second set of steps, meaning that: the first set of steps ends after the beginning of the second set of steps, the second set of steps ends after the beginning of the first set of steps; and any subset of either the first or the second set of steps may begin at any time between the beginning and end of that set of steps. The person of skill in the art will appreciate, that the foregoing definition of parallelism admits a large variety of different embodiments of the present invention, according to tradeoff between quality of service and speed that is desired, and that implementation details will vary accordingly. For example, at one possible level of parallelism, the RTCACK signal can be transmitted as soon after the TCA transmission that the access terminal only has enough time to process the TCA before it begins to receive the RTCACK from an access network's serving sector. At another possible level of parallelism, the RTCACK signal can be transmitted after the desired AN sector at which AT has pointed its DRC has had sufficient time to demodulate at least one DRC slot of the AT's transmission in order to determine that the AT has selected it as its desired serving sector. Yet another degree of parallelism would be for the AT to begin sending user traffic and/or a traffic channel complete indication as soon as a traffic channel allocation message has been received. Each type of parallelism allows a more or less certain acquisition of the DRC channel prior to the initiation of user traffic, which results in an improvement in connection speed at a potential cost in terms of quality of service over a small number of frames at the beginning of the connection. Exemplary embodiments of this new connection method having different degrees of parallelism will now be described with reference to the figures.

FIGS. 1, 3, 4a-4d, and 8 collectively illustrate an exemplary embodiment of the present invention wherein the connection setup time is reduced by broadcasting RTCACK to every member of the active set, such that the RTCACK message is transmitted to the access terminal as soon as the desired serving sector has sufficiently demodulated the access terminal's DRC/DSC channel to be able to identify itself as the desired serving sector.

FIGS. 2, 3, 5a-5c and 9 collectively illustrate an exemplary embodiment of the present invention wherein the connection setup time is reduced by using an active set having a single access network sector, and transmitting RTCACK to the access terminal before the access terminal's DRC/DSC channel is fully acquired.

In the following, embodiments of the present invention will be explained using the example of a CDMA2000 1xEV-DO connection setup; the following examples are addressed to an access terminal 200 which initiates a communication; however, it should be appreciated that the following description also applies, with such modifications as may be necessary, to the case where the access terminal 200 is the receiving party (also called the terminating user) in a communication. In the case where the access terminal 200 is the receiving party, the connection request and route update message of steps 10 (in FIG. 1) and 110 (in FIG. 2a) are preceded by a page from the access network's radio node controller 240 to the access terminal 200, which initiates the connection setup process.

Figure 10:
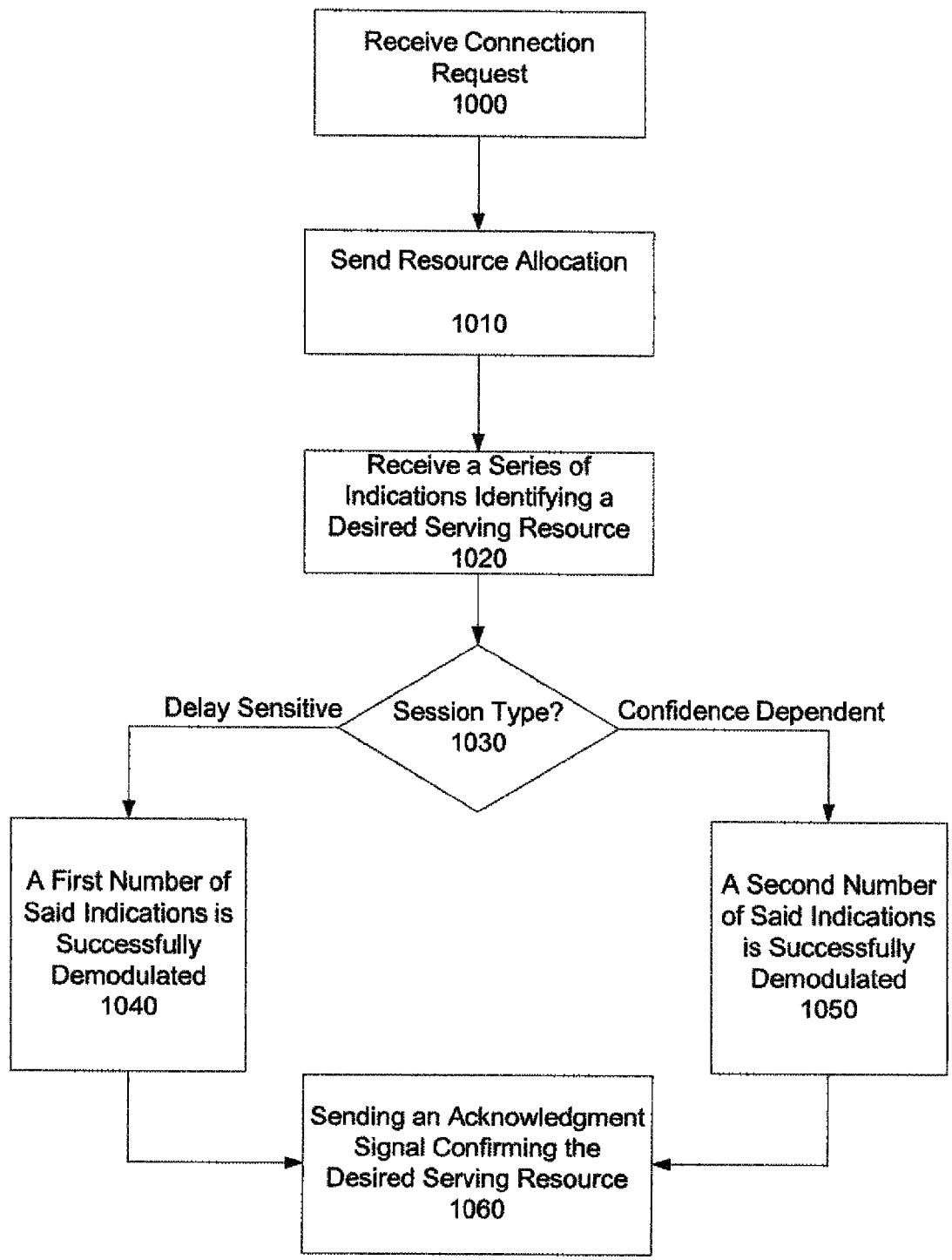
FIG. 10 is a flowchart illustrating a method according to an embodiment of the invention.

FIGS. 3 through 5c illustrate message flows through an access network, according to embodiments of the invention. It should be understood that the term access network is used in the broad sense where all access network elements are considered part of the access network for simplicity's sake. It should therefore be appreciated that the term access network, as used with reference to FIG. 10, is a generalization of the many names of the various systems, components, and software that make up an access network, which can vary depending on the type of access network (e.g. CDMA2000 1xEV-DO, WiMAX, LTE and other 3G or 4G systems). In the exemplary embodiments illustrated, the access network can be a CDMA2000 1xEV-DO network, including equipment such as base stations and associated base station controllers (BSC) which control access network sectors and radio node controllers (RNC). The BSCs and RNC each include at least one communication interface, at least one processor, and computer readable medium for storing computer programs comprising computer readable instructions, which when executed by one or more of said processors, cause said access network to carry out the methods discussed herein. In these figures, an overall system comprising an access terminal 200, a set of three access network sectors 1, 2 and 3 numbered 210, 220 and 230 respectively (referred to hereinafter as sectors 1, 2 and 3), and an access network's radio node controller (RNC) 240 will be described. It should be appreciated that other network topologies are possible, and that only three access network sector base stations are illustrated for the sake of simplicity and clarity; a greater or lesser number of access network sector base stations can also be present, and a greater or lesser number of access network radio node controllers may be present. Further, where the reader is concerned with the adaptation of the present invention to air interfaces other than 1xEV-DO as described herein, it should be apparent that where different terminology is used to describe equivalent system elements, the following description should be read with those modifications as may be necessary to translate the terminology of CDMA 2000 1xEV-DO systems to WiMAX or LTE systems (e.g., the access network in WiMax is called an access service network, which is typically a distributed system that avoids a centralized control, such that WiMAX's equivalent to RNCs are implemented in a more distributed fashion than is the case in CDMA 1xEV-DO systems).

Each of the access network sectors 1, 2 and 3 can receive transmissions from the access terminal 200 or transmit to the access terminal 200; these transmissions are indicated conceptually with dashed lines connecting the access terminal 200 to antenna icons 210, 220 and 230 in each of FIGS. 3 through 10, but it should be appreciated that in practice such communications may follow multiple paths and be received by diverse antenna elements. Each of the access network sectors 1, 2, and 3 is in communication with the overall access network's radio node controller 240. The directionality of messages to and from access network sectors 1, 2 and 3 is indicated by arrows, and the informational content of any transmissions is indicated next to the relevant communications link. Although not illustrated, it should be appreciated that each link may be segregated into an arbitrary number of channels and layers as required by the standard for the particular system. Where a communication between the access network's radio node controller 240 and the access terminal 200 is described without reference to an intermediate access network sector, it may be taken as implied that the communication has been relayed by a base station controller for at least one access network sector in a base station. As set out above with respect to FIG. 4c, there are typically three access network sectors per base station, although more or less may be present according to the specific layout of a given system.

Figure 1:
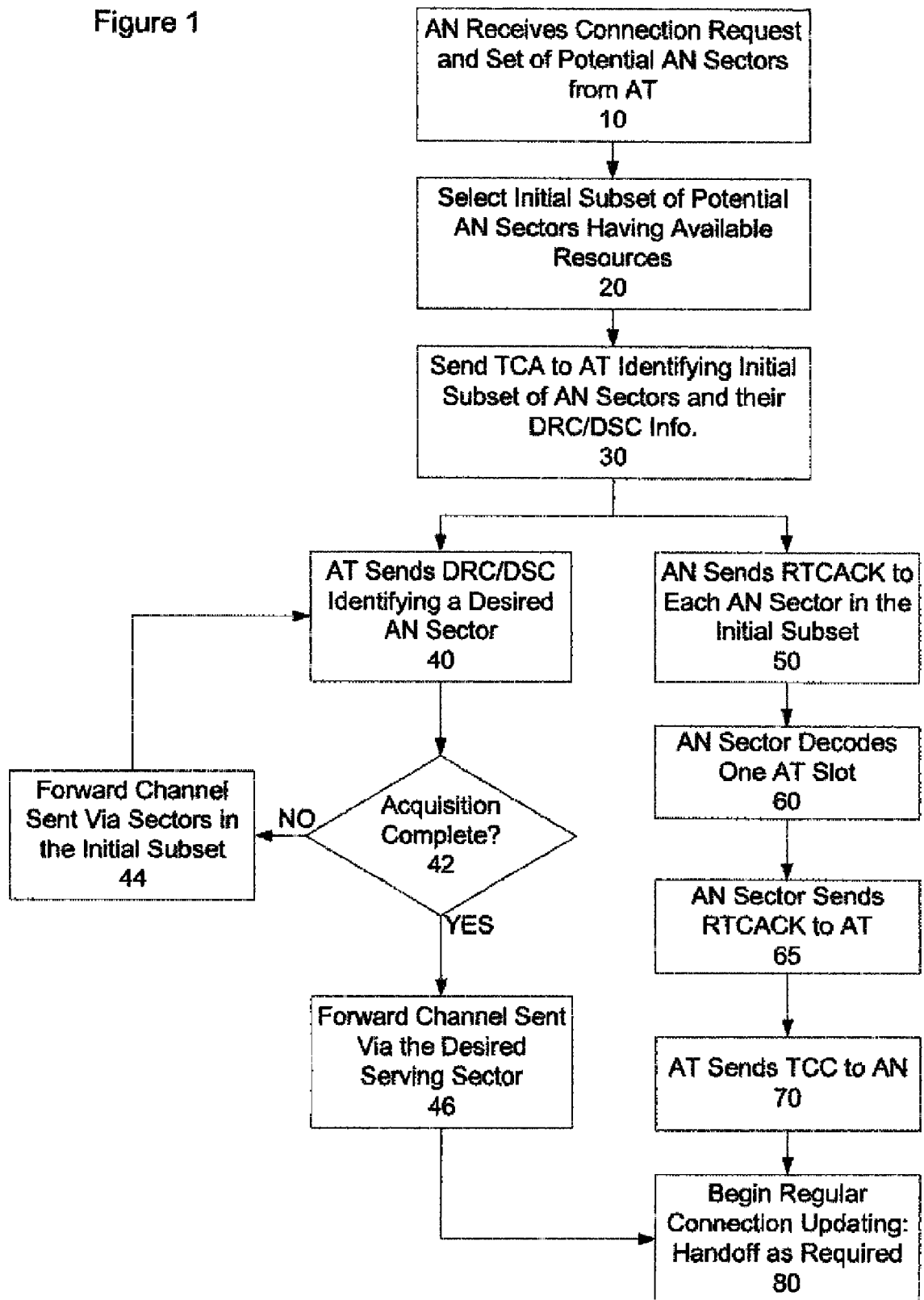
FIG. 1 is an illustration of an embodiment of the present invention whereby the connection setup time is reduced by broadcasting RTCACK to every member of the active set, such that the RTCACK message is transmitted to the access terminal as soon as the serving sector has sufficiently acquired the access terminal's DRC/DSC channel to be able to identify itself as the serving sector.
Figure 2A:
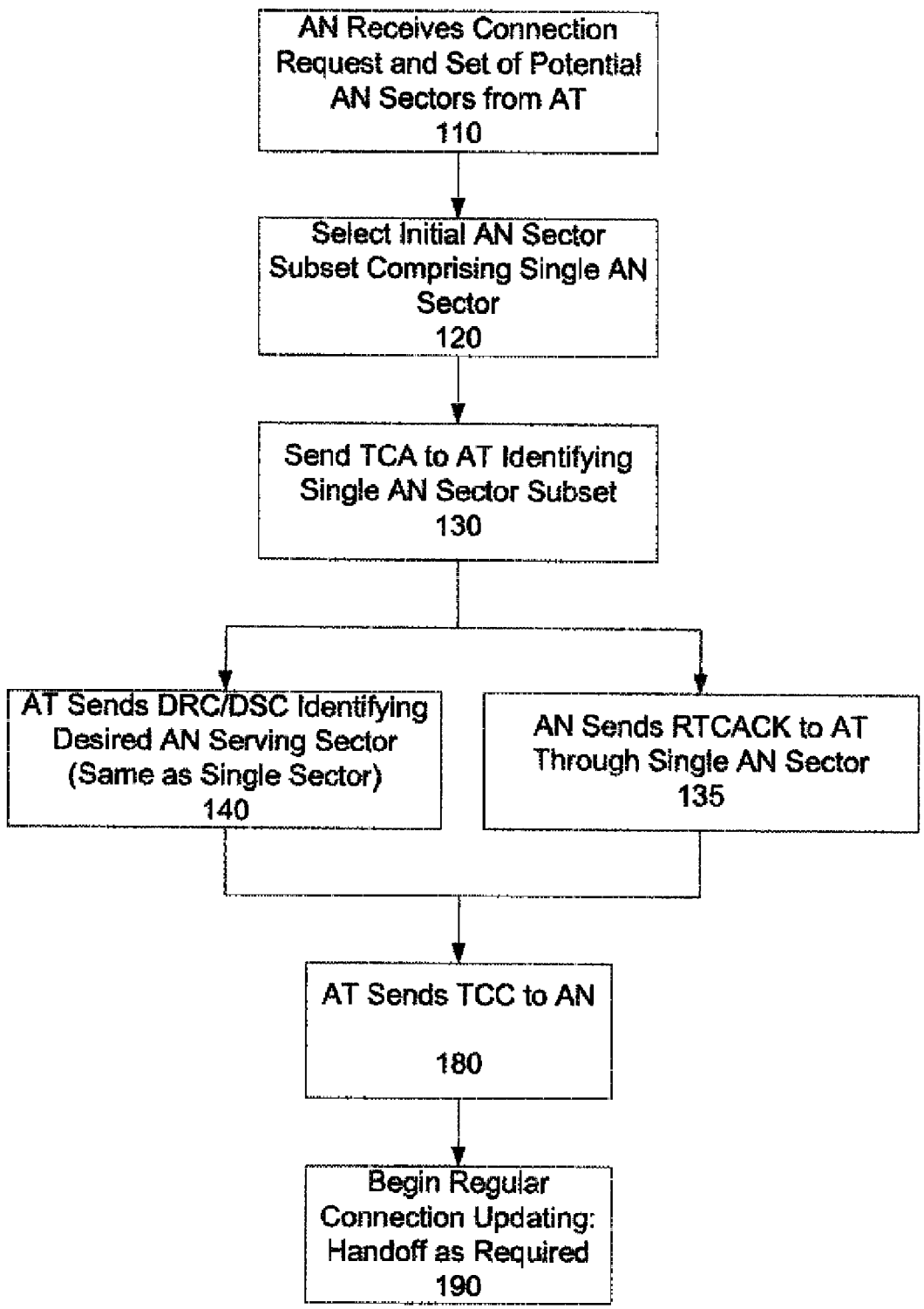
FIG. 2*a* is an illustration of an embodiment of the present invention whereby the connection setup time is reduced by using an active set having a single access network sector, and transmitting RTCACK to the access terminal before the access terminal's DRC/DSC channel is fully acquired.
Figure 2B:
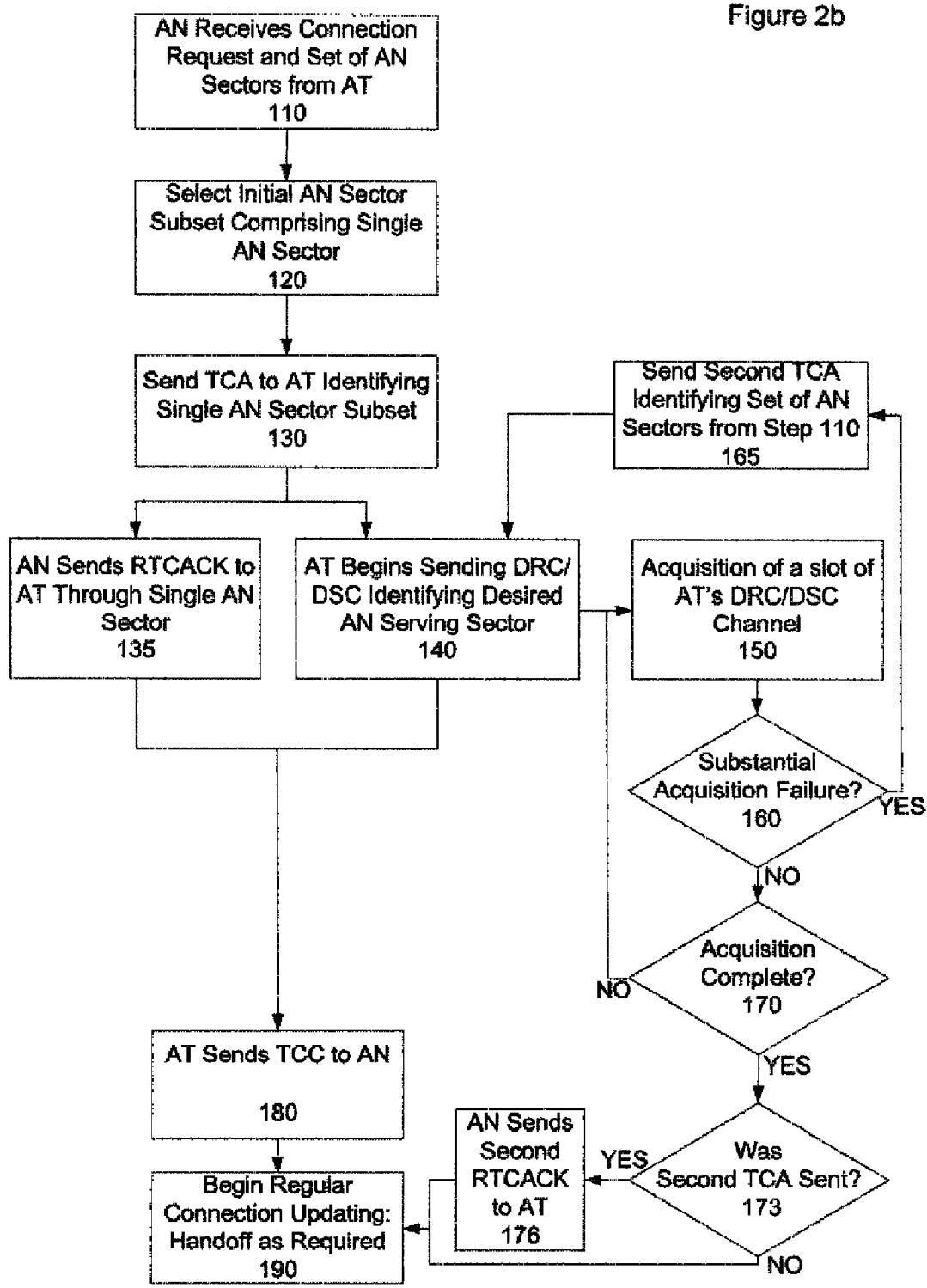
FIG. 2*b* is an illustration of a modified version of the method illustrated in FIG. 2 according to another embodiment wherein a second traffic channel allocation message is sent if the acquisition of the DRC/DSC channel by the single access network sector substantially fails.
Figure 3:
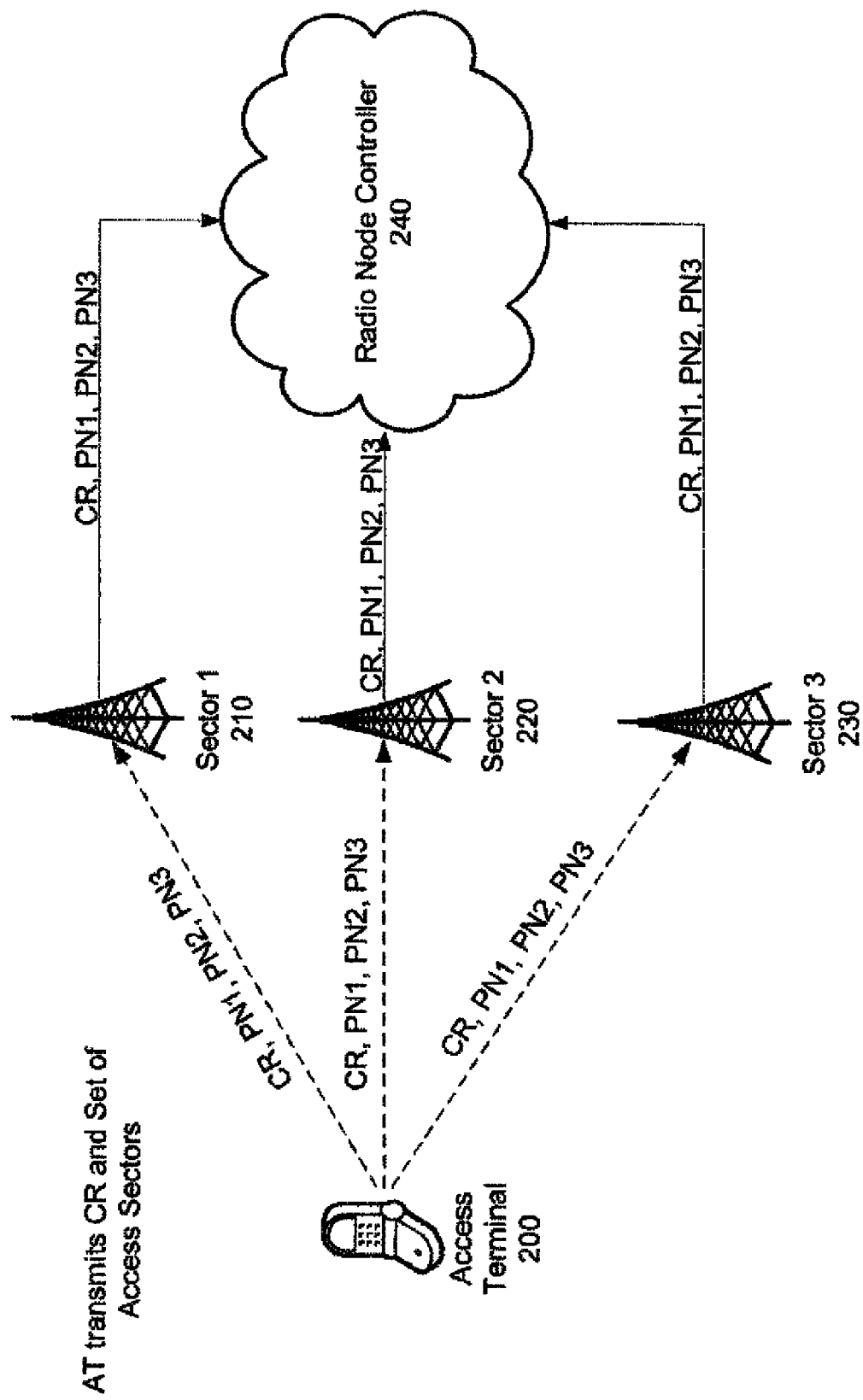
FIG. 3 is a system-level illustration of the initial step in the methods illustrated in both FIGS. 1 and 2 according to an embodiment of the invention.

Both of the embodiments described in FIGS. 1 and 2 begin with steps that can be illustrated conceptually at the system level as shown in FIG. 3. Both methods begin with a step 10 (in the case of FIG. 1) or 110 (in the case of FIG. 2a) wherein a connection request (CR) issued by the Access terminal 200 is received by the access network's radio node controller 240 after being relayed through at least one of access network sectors 1, 2 and 3. The connection request includes a route update message (RUM) that includes a list of the PN codes corresponding to each one of the access network sectors that the access terminal 200 has been able to store in its active set due to its detection of their pilot signals (in this example, sectors 1, 2 and 3), and which form the access terminal's active set. The active set also includes an assessment by the access terminal 200 of whether it is desirable to keep each active set sector in the active set, and this information is also transmitted to the access network's radio node controller 240 as part of the route update message. It should be appreciated that this active set may include more or less information as required, but that it should at least identify those access network sectors that the access terminal 200 deems potential access network sectors, in the sense that the access terminal 200 considers them potentially viable serving sectors. The CR and RUM transmitted at this step are typically modulated using a public PN code, but it should be appreciated that they can be modulated using a PN sequence specific to a given serving sector, and relayed to the access network's radio node controller 240 only by that sector; it should also be appreciated that the use of such a sector-specific PN code can be used to conserve system resources by only using a single sector to relay CR and RUM messages. In the examples illustrated by FIGS. 3 through 10, it will be assumed that the CR and RUM are transmitted using a public PN sequence, although those parts of the method of this invention that would be affected should a sector-specific PN code be used will be noted in the following description. After step 10 or step 110, the two exemplary embodiments of the present invention differ in substance, and will now be described separately with reference to their respective illustrations. First, the method illustrated in FIG. 1 will be described, and then the method illustrated in FIG. 2a will be described.

The method illustrated in FIG. 1 will now be described with reference to FIGS. 4 though 7 and 13. FIG. 13 is a timing diagram that illustrates the connection setup of the method illustrated in FIG. 1, according to an embodiment of the invention. It should be noted that access network sector 250 in FIG. 13 is intended to represent an abstraction of access network sectors 1, 2 and 3 illustrated in FIGS. 4 through 7, and should be considered to represent whichever access network sector that would be relaying a given message according to the context.

The second and third steps illustrated in FIG. 1, steps 20 and 30, are illustrated conceptually at the system level in FIG. 4a. At step 20 of FIG. 1, the access network's radio node controller 240 uses the route update message it received from the access terminal 200 to update its own active set, keeping only those access network sectors which the access terminal wishes to keep, and which have enough resources that a connection between the access network and access terminal through the given access network sector is possible; this determination may be achieved by the access network's radio node controller 240 querying the access network sectors about their available resources. In the exemplary illustration shown in FIG. 4a, the access network's radio node controller 240 has selected only sectors 1 and 2, because sector 3 does not have sufficient available resources to support a new connection. As can be seen from this example, the access network's active set can be smaller than the set of potential access network serving sectors received from the access terminal at step 10, and may be referred to as an initial subset of access network sectors, although it can also be the case that the initial subset is equivalent to the active set received from the access terminal at step 10 (i.e., the term subset is used herein in its mathematical sense of not being a strict or proper subset: a set having N elements can have a subset containing anywhere from 1 to N elements).

At step 30, the access network's radio node controller 240 transmits a traffic channel allocation (TCA) message to each of the sectors. If a private PN code was used at step 10, the TCA will be relayed by that single sector in order to conserve resources; in the present example, however, the TCA is broadcast to all of the sectors since a public PN code was used at step 10. These access network sectors then relay the traffic channel allocation signal to the access terminal 200. The traffic channel allocation signal identifies the access network sectors in the initial subset selected by the access network's radio node controller 240 from the set of potential access network serving sectors at step 20, and the traffic channel allocation message therefore leaves the access terminal 200 a choice of possible serving sectors in this example. The access terminal 200 can thus choose between the access network sectors that it identifies, in this example, sectors 1 and 2. The TCA signal contains information about the access network sectors in the access network's initial subset of access network sectors such as the PN codes corresponding to each access network sector, as well as their DRC covers and DSC values. After a sufficient amount of time has passed to allow the access terminal 200 to process the TCA signal, the method of FIG. 1 proceeds, substantially in parallel, to steps 40 and 50. It should be appreciated that more time can elapse before the method proceeds to steps 40 and 50, however, such as in situations where it is either desirable or necessary to repeat the TCA signal. For example, repetition of the TCA signal can be desirable in situations where a more robust connection setup method is made desirable or necessary in view of adverse conditions such as a fading RF environment. Repetition of the TCA signal can advantageously improve the probability of delivering the TCA message to the access terminal 200 in such conditions.

Steps 40 and 50 are illustrated conceptually at the system level in FIG. 4b. At step 40, the access terminal 200 identifies a single access network sector in its active set as its desired serving sector, usually based on its superior signal strength, and begins transmitting its desired serving sector's DRC cover and DSC value to the access network. It is said that the access terminal has pointed its DRC at its serving sector. It should be appreciated that for some embodiments, the access terminal can present the user with the PTB, and a user traffic signal or traffic channel complete signal can be transmitted to the desired serving sector by the access terminal 200 as early as this point. In the example shown in FIG. 4b, the access terminal 200 has pointed its DRC at a desired access network sector, access network sector 2. Still at step 40, once the access terminal has identified a desired access network sector at which to point its DRC, it begins transmitting the DRC cover and DSC value specific to that access network sector. In the example shown in FIG. 4b, access network sector 2 successfully demodulates at least one slot of one DRC frame, such that it is able to determine that it is the desired access network serving sector. Substantially in parallel with step 40, at step 50 of the method, the access network's radio node controller 240 broadcasts a reverse traffic channel acknowledgement message (RTCACK) to the access network sectors in its active set, in this case sectors 1 and 2. Once the access network sectors have received the RTCACK message, the method then proceeds to step 60.

At step 60, illustrated conceptually at the system level in FIG. 4b, each access network sector actively filters incoming communications for signals using its DRC cover and DSC values. In this example the access terminal 200 points its DRC at access network sector 2 in step 40, and sector 2 should be able to demodulate at least one DRC channel slot and ascertain that it is the access terminal's desired access network serving sector. Thus, before the access terminal's DRC/DSC transmission is fully acquired, the desired access network serving sector, in this case access network sector 2, relays the RTCACK message 65 to the access terminal 200 that it received at step 50 over a forward traffic channel. It should be noted that although only the AN sector which the terminal points its DRC channel should be able to demodulate the DRC/DSC transmission, more than one sector may demodulate DRC/DSC at least once due to noise. As a result, more than one sector could send RTCACK to AT. This should not cause significant problems, as the AT only listens to the serving sector its DRC points to. However, to avoid this, some embodiments can require the AN Sector to partially acquire the DRD channel by demodulating a small number N of DRC slots successfully before it sends RTCACK to AT. In this case N is substantially smaller than the number of slots needed to consider the desired serving sector fully acquired.

At this point, for some embodiments, the access terminal can present the user with the talk permit tone, referred to herein as the PTB beep (if not presented during step 40), although it should be appreciated that the RTCACK message may be repeated in the interests of robustness, such as would be the case in a fading RF environment, for example. Accordingly, user traffic transmission may begin at this point, if it has not already begun at a previous step. As used in the examples described herein, the term "PTB beep" should be understood to mean the talk permit tone; however, it should be appreciated that a PTB beep can also be any of the known alternatives to an audible talk permit tone, sufficient to allow a user of an access terminal to ascertain that user traffic may begin.

In an alternative version, the RTCACK message is broadcast by all sectors using their sector-specific coding before the sectors have completed any demodulating of the DRC/DSC signal from the access terminal 200. Demodulating of the access terminal's DRC channel still takes place as described in step 60, and the desired access network serving sector is still able to demodulate it since it is listening for a reverse link communication using its selected DRC/DSC cover, but the access terminal 200 is able to receive an RTCACK indication sooner. It should be noted that in this alternative version, only the RTCACK indication sent by the desired access network serving sector will be processed by the access terminal 200, which selects a desired access network serving sector as before. Once the access terminal 200 processes RTCACK, the access terminal can present the user with the PTB beep (if not presented during step 40), and user traffic can begin at this point.

Once an RTCACK message has been relayed to the access terminal 200, the method proceeds to step 70. At step 70, illustrated conceptually at the system level in FIG. 4d, the access terminal 200 simply transmits a traffic channel complete (TCC) message to the access network's radio node controller 240 if such a message has not already been transmitted.

As can be seen in FIG. 1, the method provides for some parallel processing in order to speed up connection time. In this method, the reverse channel is established in the right branch (starting with step 50) which allows user traffic to be sent by the originating terminal before the desired serving sector is fully acquired. This is acceptable for some delay sensitive applications, for example push to talk, in which fast connection set up is desirable, and which does not require a high confidence level in the sense that some packets can be lost without serious consequences. This is in contrast to a data transfer request for an executable file, which requires a high confidence in the quality of the traffic channel, as a single packet loss can prevent the program from operating correctly, if at all. Furthermore, most speech packets will in fact be received, as the reverse channel may be received by more than one sector. However, the forward channel is preferably only sent by the desired serving sector, once the desired serving sector if fully acquired, in order to conserve network resources.

Accordingly, FIG. 1 illustrates establishing the forward channel in the left branch, starting with step 40. If the desired serving sector is not fully acquired at step 42, then the forward traffic channel data is broadcast via the initial subset of the set of potential access network serving sectors (i.e., the sectors in the AT's active set) 44. This happens because the network does not yet know (with confidence) which sector's forward link transmissions are being demodulated by the AT. The figure shows a loop to step 40, as the DRC channel continues to be evaluated. Once a sufficient number of DRC indications have been successfully demodulated to consider the desired serving sector fully acquired, the forward link is then transmitted only via the desired serving sector 46. The desired serving sector can of course be updated by means of a handoff 80.

Note not all of the active set sectors need broadcast the forward link. In some embodiments, this may be limited to partially acquired sectors. For example, according to an embodiment, each of said initial subset of the set of potential access network serving sectors (e.g, each sector in the TCA) attempts to demodulate each DRC indication. The system then determines which of those sectors partially acquire said desired access network serving sector by successfully demodulating a first number of said indications, wherein said first number is substantially smaller than the number of indications required to be successfully demodulated in order to fully acquire the desired serving sector. The forward traffic channel data is transmitted to said access terminal via said sectors which partially acquire said desired access network serving sector before said desired access network serving sector is fully acquired; after said desired access network serving sector is fully acquired, the forward traffic channel data is transmitted to said access terminal via said desired access network serving sector.

The forward traffic channel data includes both signaling and user traffic. The initial TCA message (and its immediate repetitions, if redundant TCA messages are to be transmitted for the sake of robustness) is transmitted by all access network sectors using a forward-link common control channel. This forward-link common control channel is a public control channel, which is nevertheless modulated for transmission by each sector according to sector specific PN codes; the access terminal monitors the PN-specific transmissions from each access network sector in its active set for TCA on the common control channel after its transmission of channel request (CR) to the AN, until the TCA is received. Once it has decoded the TCA, the access terminal monitors its desired serving sector's forward traffic channel data for control-type messages such as TCA and RTCACK, as well as user traffic. The RTCACK is transmitted over the forward traffic channel of at least one of the access network sectors in the active set. After the RTCACK message is sent to the access terminal, all forward transmissions, including any subsequent TCA messages, will be sent through a forward traffic channel rather than the forward-link common control channel. Because the access terminal is only monitoring its desired serving sector's traffic channel, if an access network sector incorrectly determines that it has acquired the DRC channel when it has actually only acquired noise, it will not affect the system if that sector begins transmitting user traffic since the access terminal will not be monitoring the incorrect sector's traffic channel for user traffic by that point.

As stated above, the examples provided herein describe the methods for the originating terminal. However, similar methods can be applied to the terminating terminal (wherein the forward channel portions are of more significance, as they are more likely to carry user traffic as well as control signaling such as TCA's and RTCACKs). Such methods can, for a short period of time, consume more network resources, as the forward channel is transmitted by more than one sector until the desired serving sector is fully acquired. However embodiments of the invention enable faster connection time, as the talk permit tone does not need to wait until both the originating and terminating users have fully acquired the traffic channel.

Figure 8:
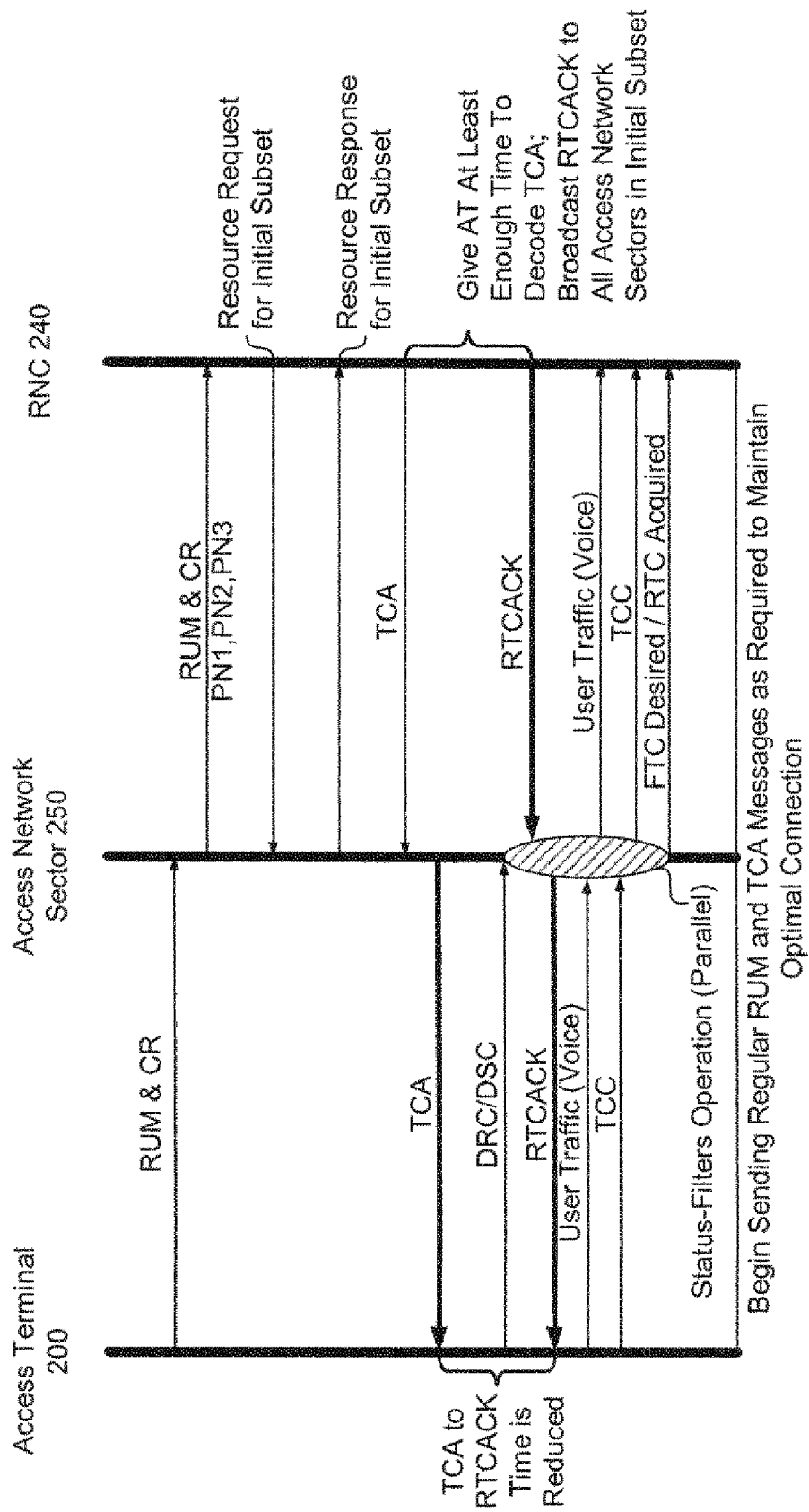
FIG. 8 is a timing diagram for the method illustrated in FIG. 1 according to an embodiment of the invention.
Figure 9:
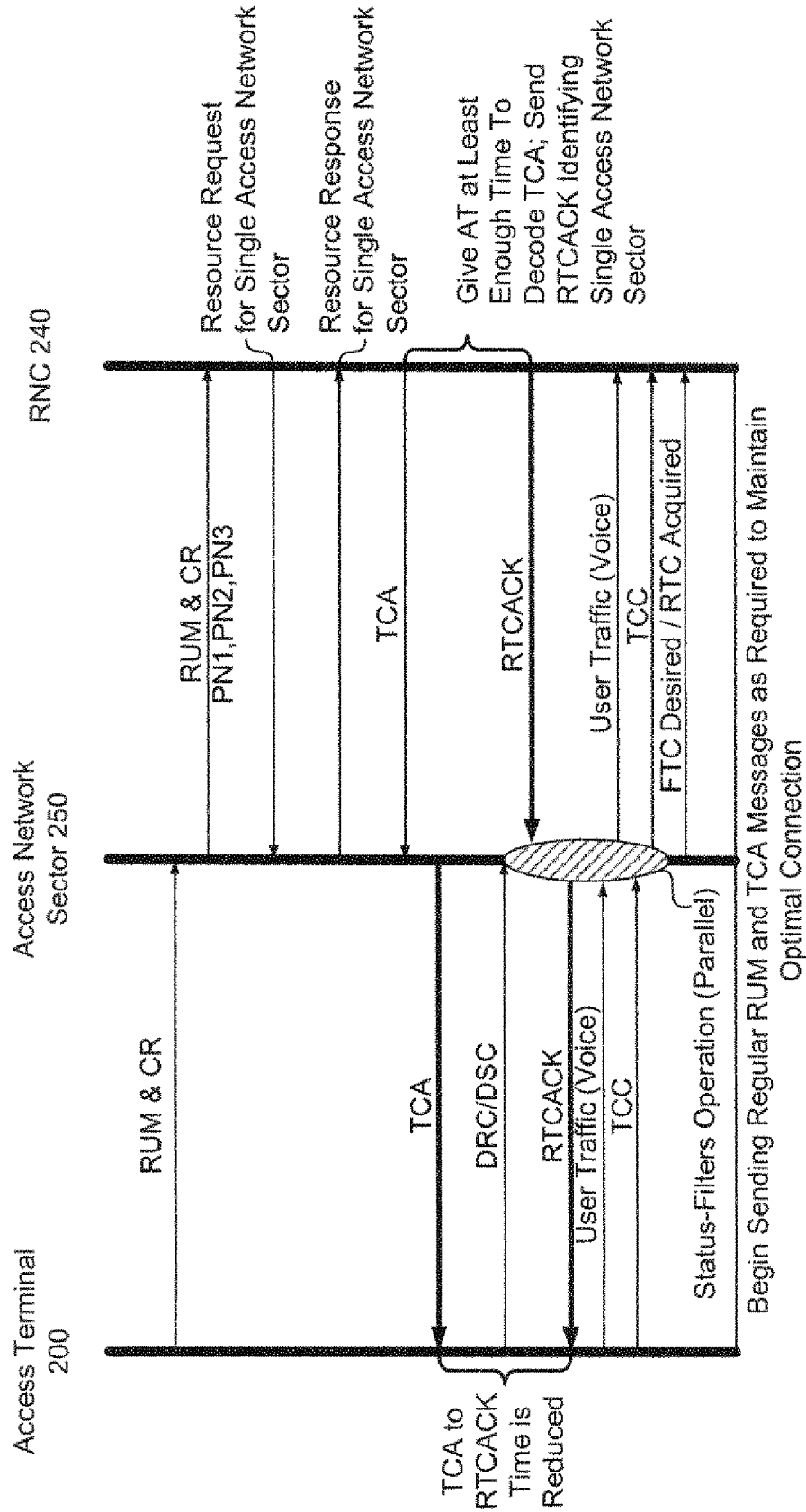
FIG. 9 is a timing diagram for the method illustrated in FIG. 2 according to an embodiment of the invention.

The method illustrated in FIG. 2*a* will now be described with reference to FIGS. 8 though 10, and 14. FIG. 14 is a timing diagram that illustrates the connection setup of the method illustrated in FIG. 2*a*, according to an embodiment of the invention. It should be noted that access network sector 250 in FIG. 14 is intended to represent an abstraction of access network sectors 1, 2 and 3 illustrated in FIGS. 8 through 10, and should be considered to represent whichever access network sector that would be relaying a given message according to the context.

The second and third steps illustrated in FIG. 2*a*, steps 120 and 130, are illustrated conceptually at the system level in FIG. 5*a*. At step 120 of FIG. 2*a*, the access network's radio node controller 240 uses the route update message it received from the access terminal 200 to update its own active set, but in contrast to the method illustrated in FIG. 1, the access network in this example selects an initial subset of potential access network serving sectors containing a single access network sector. As noted above, an initial subset of potential access network serving sectors where the subset is of size one can also be forced upon the access network's radio node controller 240 as a result of a situation where the access terminal 200 has already selected a desired access network serving sector at step 110 by sending a CR and RUM modulated using a PN code specific to the desired access network sector, although for the purposes of this example it will be assumed that the single access network sector is chosen by the access network's radio node controller 240. Regardless of how it is chosen, the single access network sector should have enough resources that a connection between the access network and access terminal through the given access network sector is possible. In this example, the selection of a single access network sector is made based on signal strength, but it should be appreciated that it can also be made based on other criteria, for example: the degree of resource (processing resources; e.g. hardware resources) availability, the pilot drop rate for a given access network sector, whether the access terminal 200 has modulated its access probe signal using a private PN code in its initial access probe; whether the sector is busy (connection resources; e.g. spectrum resources). In the exemplary illustration shown in FIG. 5*a*, the access network's radio node controller 240 has selected sector 3 as the single access network sector. At step 130, the access network's radio node controller 240 transmits a traffic channel allocation (TCA) message to all of the access network sectors in the set of potential access network serving sectors that was sent by the access terminal 200 at step 110, in this case access network sectors 1, 2 and 3. These access network sectors then relay the traffic channel allocation signal to the access terminal 200. The TCA signal contains information about the single access network sector in the access network's initial subset, including the PN code for the single access network sector (in this case PN3), as well as its DRC cover and DSC value. After a sufficient amount of time has passed to allow the access terminal 200 to process the TCA signal, the method of FIG. 2a proceeds, substantially in parallel, to steps 140 and 135. As with the method of FIG. 1, it should be appreciated that more time can elapse before the method proceeds to steps 140 and 135, so that messages such as the TCA message can be repeated.

Figure 5B:
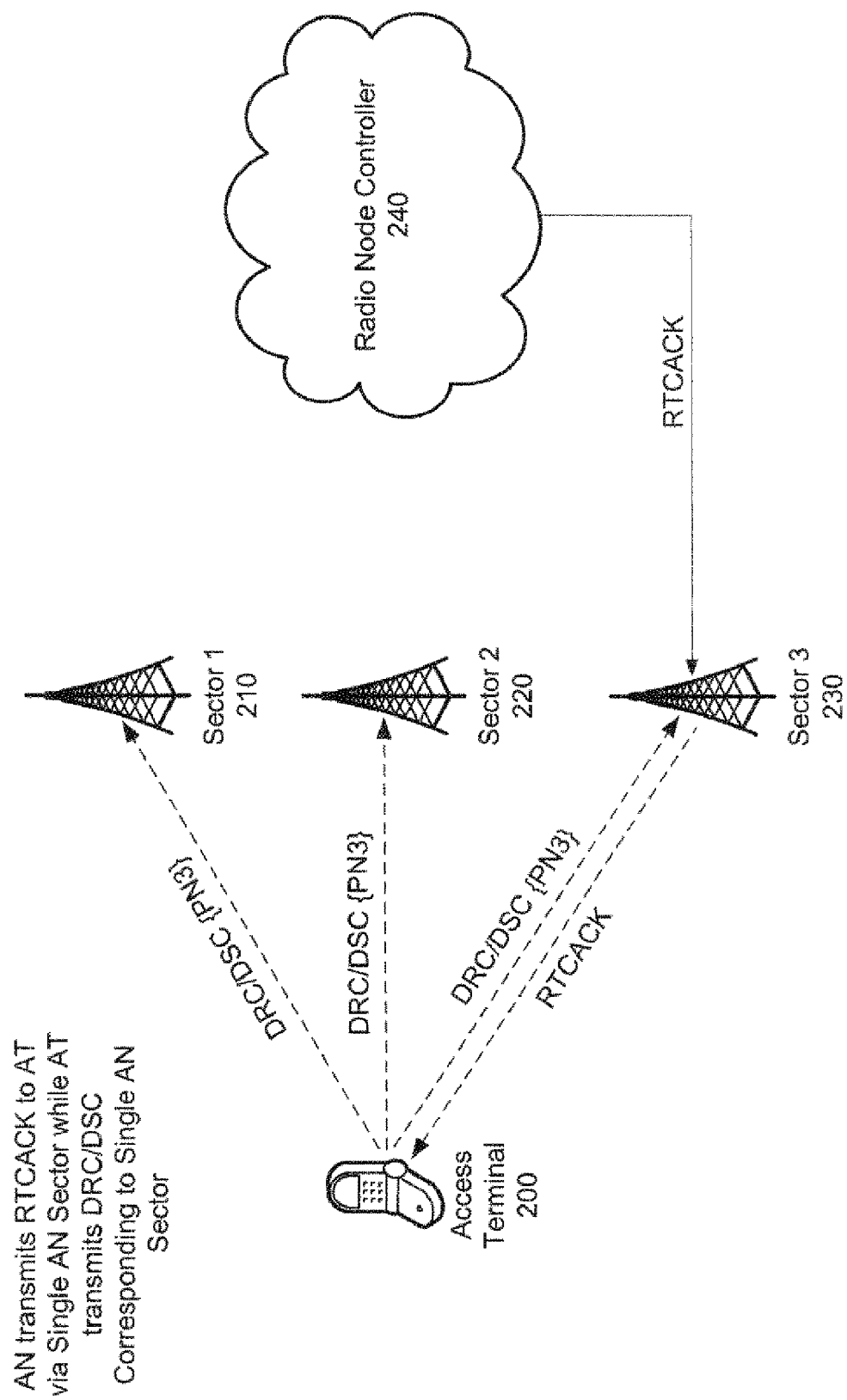
FIG. 5b is a system level illustration of the fourth (parallel) steps in the method illustrated in FIG. 2 according to an embodiment of the invention.
Figure 6:
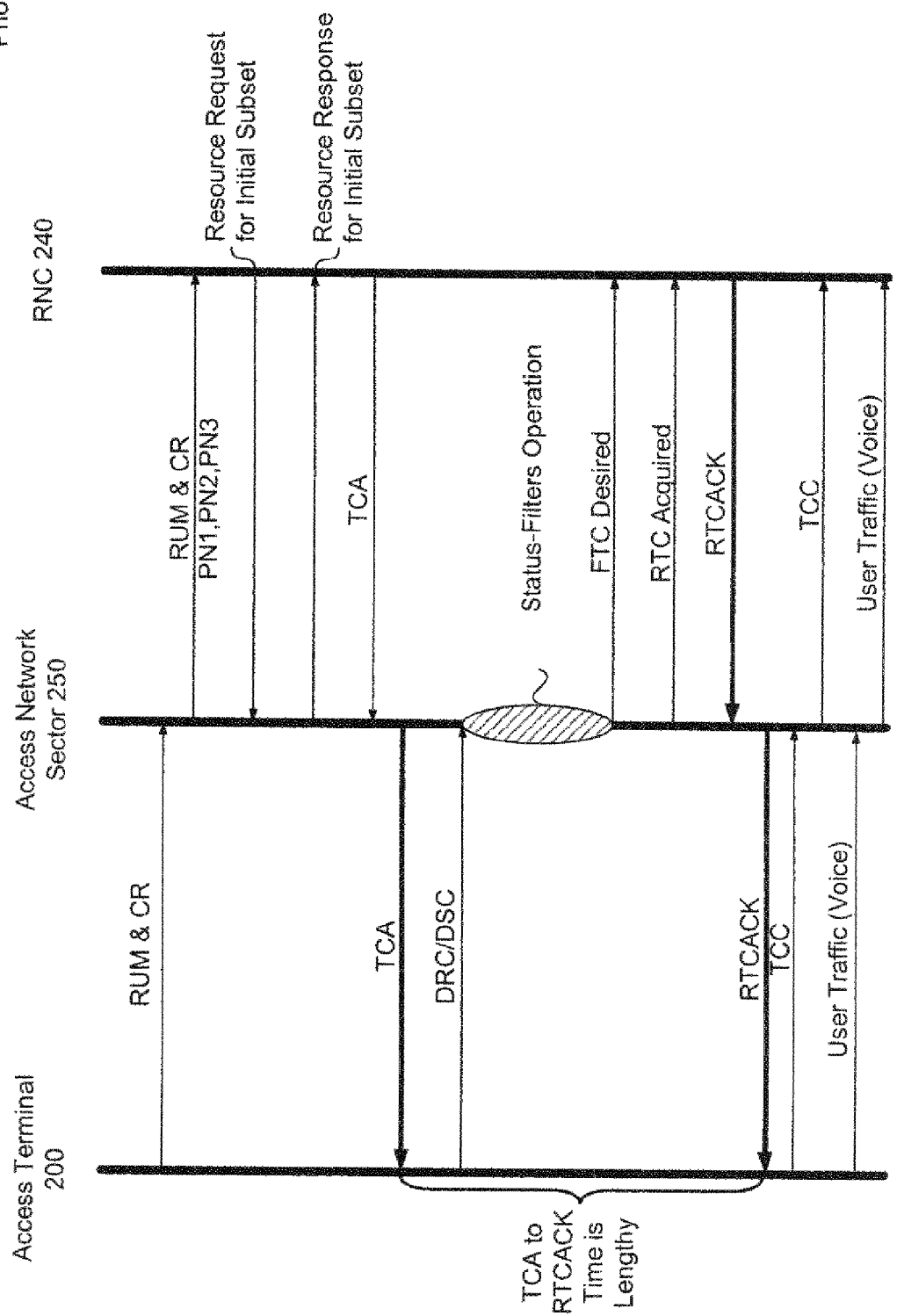
FIG. 6 is a timing diagram for the prior art method illustrated in FIG. 7 according to an embodiment of the invention.

Steps 140 and 135 of the method of FIG. 2a are illustrated conceptually at the system level in FIG. 5b. At step 140, the access terminal 200 is immediately able to point its DRC at the single access network sector identified by the TCA sent in step 130, since there are no other choices; the access terminal 200 is effectively forced to select the single access network sector selected at step 120 as its desired access network serving sector. In the example shown in FIG. 5b, the access terminal has pointed its DRC at sector 3. At step 140, the access terminal 200 begins transmitting the DRC cover and DSC value specific to the single access network sector identified in the TCA from step 130. This is the first sector-specific modulated message that the access network will receive from the access terminal, since previous messages could have been coded such that more than one access network sector could receive them. By sector-specific modulation, it is meant that the transmission of the DRC cover and DSC value information over a DRC/DSC channel can be considered to be information identifying a desired access network serving sector, since it is modulated in such a way that only the desired access network serving sector can demodulate it. In the present example, the information identifying a desired access network serving sector is the transmission over the DRC/DSC channel, which is modulated according to a Walsh spreading function such that only the desired serving sector can consistently demodulate the signal. By consistently successfully demodulating a transmission over the DRC/DSC channel, the desired serving sector is said to "acquire" the information identifying the desired access network serving sector. Full acquisition of this signal is contingent upon the successful demodulation of a large number of DRC/DSC slots, and typically takes as long as 200 ms. Full acquisition of the DRC channel can allow the access network's radio node controller to reduce the number of access network sectors broadcasting information over the forward link (e.g. TCA messages, user traffic, and control signals). Prior to full acquisition of the DRC channel, the access network's radio node controller 240 instructs each of the access network sectors 250 identified at step 20 to relay all forward traffic to the access terminal 200 in order to ensure the receipt of forward-link transmissions. After the full acquisition of the DRC channel has provided the access network's radio node controller 240 with a set of indications identifying the desired access network serving sector, the access network's radio node controller 240 need only transmit forward-link information through the desired access network serving sector, thus saving resources in the other access network sectors.

In 1 xEV-DO systems, each sector uses filters whose frequency response parameters are defined by a Walsh spreading function that corresponds to the DRC covers specific to that sector, and the demodulation operation includes a despreading operation. Once a sufficient number of DRC/DSC slots have been successfully filtered and demodulated/despread, the DRC/DSC channel is fully acquired. Where a substantial number of DRC channel slots cannot be successfully filtered, demodulated or despread, it may be said that there has been an acquisition failure, with the term acquisition failure meaning that the number of unsuccessfully filtered, demodulated or despread DRC slots indicates that the DRC channel has demonstrated a quality of service that is below the standards set for the system, such as an error rate standard, a signal to noise standard, or any other similar standard known to those of skill in the art. In practice, the most common means of evaluating acquisition failure is to count how many of the first 200 DRC slots are demodulated successfully and to consider the acquisition successful once a threshold percentage of those first 200 DRC slots have been successfully modulated, and unsuccessful if the first 200 DRC slots are received without a threshold percentage of them having been demodulated successfully. A typical threshold percentage is 60%.

In the present example, since only a single access network sector was identified at step 120, this single access network sector need not perform any demodulating in order to know that it is the access network sector serving the access terminal 200. Substantially in parallel with step 140, at step 135 of the method illustrated in FIG. 2b, the access network's radio node controller 240 transmits a reverse traffic channel acknowledgement message (RTCACK) to the access terminal 200 through the single access network sector identified at step 120. Once the access terminal has received the RTCACK message, the method then proceeds to step 160. Although we state that these steps occur in parallel, that does not mean step 135 must occur at precisely the same time as step 140; it may be the case that step 135 occurs anytime after the access terminal has had enough time to process the TCA from step 130, or it may be the case that at least one of the DRC/DSC frames transmitted at step 140 is demodulated before the RTCACK is transmitted. It should also be appreciated that the RTCACK of step 135 may be repeated as required in order to improve system robustness, as described above with reference to the TCA message.

Although it is not illustrated in FIG. 2a, the RTCACK message transmitted at step 135 can also trigger the initiation of forward user traffic, which can be immediately relayed to the access terminal 200 via the single desired serving sector selected at step 120; this can reduce connection setup time in the case where the access terminal 200 is the access terminal which is on the receiving end of a PTT communication, for example. After steps 135 and 140, the method proceeds to step 180. At step 180, illustrated conceptually at the system level in FIG. 5c, the access terminal 200 simply transmits a traffic channel complete (TCC) message to the access network's radio node controller 240 through its desired access network serving sector at which it is pointing its DRC, which is sector 3 in this example. It will be appreciated by those of skill in the art that, as was the case with the method illustrated in FIG. 1, the user can be presented with a PTB such that user traffic may begin at any step in the method illustrated in FIG. 1, depending on the trade-off between connection speed and quality of service that is desired.

In both the method illustrated in FIG. 1 and the method illustrated in FIG. 2a, the methods optionally terminate with a step wherein the system begins a protocol wherein regular connection updating occurs (step 80 in FIG. 1, step 190 in FIG. 2a). Because the method of the present invention accelerates the process of selecting a desired access network sector in the interests of improving connection speed, it could be that the optimal access network sector is not selected during the initial connection setup. For example, there may be difficulty in fully acquiring the desired access network serving sector, implying a better access network serving sector should be selected, and a handoff to that better sector should occur, in a similar manner to handoffs due to terminal mobility. Accordingly, at respective steps 80 or 190, the methods of FIGS. 1 and 2 will continuously monitor their nearby access network sectors' performance-related characteristics such that handoffs of the connection from one access network sector to another may be performed after the initial connection setup in order to improve the quality of service over the connection.

Because only a single access network sector is identified in the exemplary method identified above with reference to FIG. 2a, this method may be modified as illustrated in FIG. 2a in order to improve its robustness. Specifically, FIG. 2a includes the following additional steps: a step 150 where a slot of the access terminals' DRC/DSC channel is acquired, a step 160 where the substantial success or failure of the DRC/DSC channel acquisition is evaluated, a step 170 where the completion of the DRC/DSC acquisition process is evaluated, and a step 165 where a second traffic channel allocation is sent, in the event that there has been a substantial failure to acquire the DRC/DSC channel. Additional step 173 determines whether step 165 has occurred, and step 176 causes the access network's radio node controller 240 to send another RTCACK message the method determines that step 165 has occurred at step 173. The method of FIG. 2a improves the robustness of the method illustrated in FIG. 2a because, in the event that the single AN sector identified at step 130 proves to possess a DRC/DSC channel whose quality of service is below the standards set for the system, a substantial acquisition failure will be detected at step 160, whereupon the method proceeds to step 165 where a second traffic channel allocation message, this time identifying all of the access network sectors originally proposed as potential access network serving sectors at step 110, is sent to the access terminal 200, which then points its DRC at another access network sector from the set of potential access network sectors identified at step 110. This re-execution of step 140 differs from the first execution of step 140 in that the access terminal 200 will now be able to choose a desired serving sector, since it is given more than one option. This means that, where the initial single access network sector proves to be unreliable, the method of FIG. 2a allows the access terminal 200 to adapt by expanding the range of access network sectors from which the access terminal 200 may choose. Where no substantial acquisition failure is detected at step 170, the acquisition completion evaluation at step 170 and the acquisition step at 150 proceed in a loop, in parallel to other steps in the process such as user traffic, which may have begun as early as the beginning of the first DRC/DSC transmission at step 140. The acquisition process continues until acquisition is determined to be complete at step 170, and the method proceeds to step 173. At step 173, the method determines whether a second TCA was sent at step 165 as a result of a substantial acquisition failure, in which case an RTCACK message is re-sent in order to ensure that the access terminal 200 has received an RTCACK message. After a negative determination at step 173, or after processing step 176, the method proceeds to step 90 as described above with reference to FIG. 2a. It should be noted, however, that although the method illustrated in FIG. 2b proceeds to step 190 after the full acquisition of the DRC/DSC channel has been confirmed at step 170, the method can also proceed to step 180 in an alternate embodiment where a TCC message is not sent until the DRC/DSC channel is fully acquired.

A method according to another embodiment of the invention will now be described with reference to FIG. 10, which comprises: a step 1000 where an access network receives a connection request 1000 for a communication session from an access terminal which identifies a set of potential serving resources; a step 1010 where a resource allocation is sent to the access terminal identifying an initial subset of the set of potential serving resources; a step 1020 where the access network receives a series of indications identifying a desired serving resource; a step 1030 where the access network determines whether the communications session is a delay-sensitive or a confidence-dependent communications session; a step 1040 where a first number of said indications is successfully demodulated for a delay sensitive session; a step 1050 where a second number of said indications is successfully demodulated for a confidence dependent session; and a step 1060 where the access network sends an acknowledgement signal confirming said desired serving resource after either step 1040 or step 1050. The method illustrated in FIG. 10 illustrates an embodiment of the present invention in the context of a system that may deal with both delay-sensitive sessions and confidence dependent sessions. Delay-sensitive sessions are sessions like voice communications, streaming multi-media data transmissions, and generally, any other transmission where quality of service is relatively less important than speed of service or connection set-up time. Confidence-sensitive sessions are sessions like data communications, secure communications, and generally any other transmission where quality of service is relatively more important than the speed of service or connection set-up time.

The method of FIG. 10 begins at step 1000 where the access network receives a connection request for a communication session from an access terminal. The connection request identifies a set of potential serving resources. By way of example, in the case of a 1xEV-DO system, the potential serving resources can be access network sectors that the access terminal has identified by the strength of their pilot signal, and these potential serving resources can be described as the access terminal's active set. The connection request at step 1000 either includes, or is accompanied by, information that can enable the access network to determine whether the desired communication session is a delay sensitive session or a confidence dependent session. After step 1000, the method can either proceed to step 1030 or step 1010, although the method illustrated at FIG. 10 shows step 1010 following step 1000 for clarity's sake. The reason that step 1030 can proceed immediately after step 1000 is that information enabling the access network to determine the session type will have been received as part of that step, consequently, step 1030 can be carried out anytime after step 1000 and anytime before the beginning of steps 1040 and 1050. Although it is not illustrated, it should therefore be understood that steps 1010 and 1030 can both follow step 1000 and be executed in parallel, in which case step 1020 could also be executed in parallel to step 1030. In the case where execution proceeds from step 1000 to step 1010, the access network sends a resource allocation to the access terminal identifying an initial subset of the set of potential serving resources identified at step 1000, this initial subset can be the same size as the set of potential serving resources identified at step 1000, or it can be a smaller subset that has been selected according to criteria such as: serving resource availability, serving resource processor availability, serving resource bandwidth availability, serving resource drop rate, serving resource signal strength. The resource allocation is a transmission that informs the access terminal which potential serving resources are available to the access terminal to choose as a desired serving resource for a forward link that will be established between the desired serving resource and the access terminal. By way of example, in a 1xEV-DO system, the resource allocation message is called a traffic channel allocation (TCA), and is said to update the access terminal's active set to the active set selected by the access network. After step 1010, the method of FIG. 10 proceeds to step 1020, where the access network receives a series of indications transmitted by the access terminal and identifying the access terminal's desired serving resource. The series of indications may be a single indication, or it may be a several hundred. The purpose of the series of indications is at least to indicate to the access network which potential serving resource of the initial subset of potential serving resources it has selected as a desired serving sector, although the series of indications may carry other information such as data rate control information in a 1xEV-DO system, for example.

After step 1020, the method of FIG. 10 proceeds to step 1030, if it has not already done so after step 1000, as described above. At step 1030, the access network determines whether the session requested at step 1000 is a confidence dependent session or a delay sensitive session. For example, the access network may be configured to identify all PTT sessions as delay sensitive, and file transfer data sessions as confidence dependent. The specific classification of all the possible communications sessions as either delay-sensitive or confidence-dependent can be configurable at the access terminal and/or in the access network, and can depend on a number of factors apparent to those of skill in the art. When the determination made at step 1030 is that the desired communications session is delay-sensitive, the method executes an expedited connection set-up as discussed herein, as shown generally as step 1040 wherein a first number of the indications from step 1020 are successfully demodulated. When the determination made at step 1040 is that the desired communications session is confidence dependent, the method executes an conventional connection set-up process, for example, one which requires full acquisition of the serving resource, as shown generally as step 1050 wherein a second number of the indications from step 1020 are successfully demodulated. The first number of indications that are successfully demodulated at step 1040 is less than the second number of indications that are successfully demodulated at step 1050. In one possible embodiment of the invention, the first number of indications at step 1040 can be zero. It should be apparent, in view of the foregoing, that step 1020 can be executed in parallel to step 1030, and that it may be executed in parallel with either step 1040 or 1050, although step 1020 must begin prior to, or at substantially the same time as steps 1040 and 1050. It should be understood that although the term demodulation is used with reference to steps 1040 and 1050, it may be the case that the demodulation also includes some combination of despreading, time or frequency demultiplexing, decryption, autocorrelation, demodulating, mapping or any other processing that is required to identify a desired serving resource. After step 1040 or step 1050, the method proceeds to step 1060, where the access network sends the access terminal an acknowledgment signal confirming the desired serving resource.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A method of setting up a communications link between an access terminal and an access network, the method comprising the steps of:
   a) receiving a connection request and a set of potential access network serving sectors from the access terminal for said communications link;
   b) sending a traffic channel allocation to the access terminal identifying an initial subset of the set of potential access network serving sectors for said communications link; and
   c) sending a reverse traffic channel acknowledgement indication to the access terminal, via at least one access network serving sector selected from the initial subset, before a desired access network serving sector for said communications link is fully acquired, wherein said communications link is a single communications link.

2. The method of claim 1 further comprising the step of: subsequent to the step of sending a traffic channel allocation to the access terminal identifying an initial subset of the set of potential access network serving sectors, and before a desired access network serving sector is fully acquired, receiving user traffic from the access terminal.

3. The method of claim 1 further comprising the step of: subsequent to the step of sending a traffic channel allocation to the access terminal identifying an initial subset of the set of potential access network serving sectors, and before a desired access network serving sector is fully acquired, sending an indication to a user of said access terminal that user traffic can commence.

4. The method of claim 1 further comprising receiving from said access terminal a series of indications identifying a desired access network serving sector.

5. The method of claim 4 wherein the series of indications identifying a desired access network serving sector comprises a DRC channel information.

6. The method of claim 4 wherein step c) comprises:
i) each of said initial subset of the set of potential access network serving sectors attempting to demodulate said series of indications;
ii) determining which sectors partially acquire said desired access network serving sector by successfully demodulating a first number of said indications;
iii) transmitting forward traffic channel data to said access terminal via said sectors which partially acquire said desired access network serving sector before said desired access network serving sector is fully acquired; and
iv) transmitting forward traffic channel data to said access terminal via said desired access network serving sector after said desired access network serving sector is fully acquired.

7. The method of claim 6 wherein said first number is substantially smaller than the number of indications required to be successfully demodulated in order to fully acquire the desired serving sector.

8. The method of claim 7 further comprising the step of:
subsequent to the step of sending a reverse traffic channel acknowledgement, and before a desired access network serving sector is fully acquired, receiving a traffic channel complete indication from the access terminal.

9. The method of claim 7 further comprising the step of:
subsequent to the step of sending a reverse traffic channel acknowledgement, and before a desired access network serving sector is fully acquired from the access terminal, receiving user traffic from the access terminal.

10. The method of claim 7 further comprising the step of:
subsequent to the step of sending a reverse traffic channel acknowledgement, completing the acquisition of the desired access network serving sector from the access terminal.

11. The method of claim 10 further comprising the step of:
subsequent to the step of completing the acquisition of the desired access network serving sector from the access terminal, receiving a traffic channel complete indication from the access terminal.

12. The method of claim 4 wherein step c) comprises:
i) transmitting forward traffic channel data to said access terminal via said initial subset of the set of potential access network serving sectors before a desired access network serving sector is fully acquired; and
ii) transmitting forward traffic channel data to said access terminal via said desired access network serving sector after said desired access network serving sector is fully acquired.

13. The method of claim 1 wherein the initial subset comprises a single access network sector.

14. The method of claim 13 wherein, upon detecting that an attempt to acquire a desired access network serving sector has failed, replacing the single access network sector with a second initial subset comprising the set of potential access network serving sectors, and repeating step b) of sending a traffic channel allocation.

15. The method of claim 1 wherein the step of sending a traffic channel allocation is repeated a plurality of times to increase a probability that the access terminal will receive the traffic channel allocation.

16. The method of claim 1 wherein the step of sending a reverse traffic channel acknowledgement is repeated a plurality of times to increase a probability that the access terminal will receive the reverse traffic channel acknowledgement.

17. The method of claim 1, wherein the desired access network serving sector is fully acquired when a sufficient number of data rate control (DRC) channel slots have been demodulated.

18. The method of claim 17, wherein said sufficient number of data rate control (DRC) channel slots have been demodulated is at least one.

19. A method of setting up a communications link between an access terminal and an access network, the method comprising the steps of:
a) receiving a connection request and a set of potential access network serving sectors from the access terminal for said communications link;
b) sending a traffic channel allocation to the access terminal identifying an initial subset of the set of potential access network serving sectors for said communications link; and
c) performing at least one of the following steps in parallel with a step of fully acquiring a desired access network serving sector for said communications link, wherein said communications link is a single communications link:
c1) sending a reverse traffic channel acknowledgement indication to the access terminal via at least one access network serving sector selected from the selected subset;
c2) receiving user traffic from the access terminal; and
c3) receiving a traffic channel complete indication from the access terminal.

20. A method as claimed in claim 19 wherein forward channel transmissions are sent to the access terminal by said initial subset of the set of potential access network serving sectors in parallel with said step of fully acquiring a desired access network serving sector until said desired access network serving sector is fully acquired.

21. A method as claimed in claim 20 wherein only sectors which partially acquire said desired access network serving sector sends forward channel transmissions.

22. The method of claim 19, wherein said step of fully acquiring a desired access network serving sector occurs when a sufficient number of data rate control (DRC) channel slots have been demodulated.

23. The method of claim 22, wherein said sufficient number of data rate control (DRC) channel slots have been demodulated is at least one.

* * * * *

UNITED STATES PATENT AND TRADEMARK OFFICE
CERTIFICATE OF CORRECTION

| | | |
|---|---|---|
| PATENT NO. | : 8,134,963 B1 | Page 1 of 1 |
| APPLICATION NO. | : 12/098073 | |
| DATED | : March 13, 2012 | |
| INVENTOR(S) | : Chen et al. | |

It is certified that error appears in the above-identified patent and that said Letters Patent is hereby corrected as shown below:

In Column 1, Lines 26-27, delete "voice over Internet Protocol (VOIP)." and insert -- Voice over Internet Protocol (VoIP). --, therefor.

In Column 1, Line 32, delete "VOIP" and insert -- VoIP --, therefor.

In Column 1, Line 40, delete "VOIP" and insert -- VoIP --, therefor.

In Column 20, Line 39, in Claim 20, delete "A" and insert -- The --, therefor.

In Column 20, Line 45, in Claim 21, delete "A" and insert -- The --, therefor.

Signed and Sealed this
Tenth Day of July, 2012

David J. Kappos
*Director of the United States Patent and Trademark Office*